US012809914B1

(12) United States Patent
Penfield et al.

(10) Patent No.: US 12,809,914 B1
(45) Date of Patent: Nov. 24, 2026

(54) COMPUTING SYSTEM AND METHOD FOR STRUCTURING UNSTRUCTURED DOCUMENT DATA

(71) Applicant: VelocityEHS Holdings, Inc., Chicago, IL (US)

(72) Inventors: Julia Penfield, Seattle, WA (US); Aatish Suman, Balmoral Crescent (SG)

(73) Assignee: VelocityEHS Holdings, Inc., Chicago, IL (US)

( * ) Notice: Subject to any disclaimer, the term of this patent is extended or adjusted under 35 U.S.C. 154(b) by 0 days.

(21) Appl. No.: 19/314,650

(22) Filed: Aug. 29, 2025

Related U.S. Application Data

(63) Continuation of application No. 19/223,968, filed on May 30, 2025, now Pat. No. 12,505,156.

(51) Int. Cl.
*G06F 16/00* (2019.01)
*G06F 16/55* (2019.01)

(52) U.S. Cl.
CPC .................................... *G06F 16/55* (2019.01)

(58) Field of Classification Search
CPC ....................................................... G06F 16/55
See application file for complete search history.

(56) References Cited

U.S. PATENT DOCUMENTS

2019/0179842 A1 6/2019 Shah et al.
2023/0306003 A1* 9/2023 Jain ....................... G06F 16/213

* cited by examiner

*Primary Examiner* — Ajith Jacob
(74) *Attorney, Agent, or Firm* — Shu Chen

(57) ABSTRACT

Computing systems and methods are configured to structure unstructured document data. An example computing system is configured to receive an input in the form of a document containing unstructured data, determine a plurality of entities to be identified and retrieved from the input, analyze each entity to determine identification and retrieval computational techniques, group the plurality of entities into different categories based on the identification and retrieval computational techniques, generate multiple images of the input in different dot per inches, extract machine-readable texts from the multiple images of the input, conduct a text extraction for native PDF in the input, apply the identification and retrieval computational techniques to identify and retrieve the plurality of entities in different categories based at least upon the machine-readable texts extracted from the multiple images of the input and the native PDF in the input, and save processing results in at least one structured database.

20 Claims, 6 Drawing Sheets

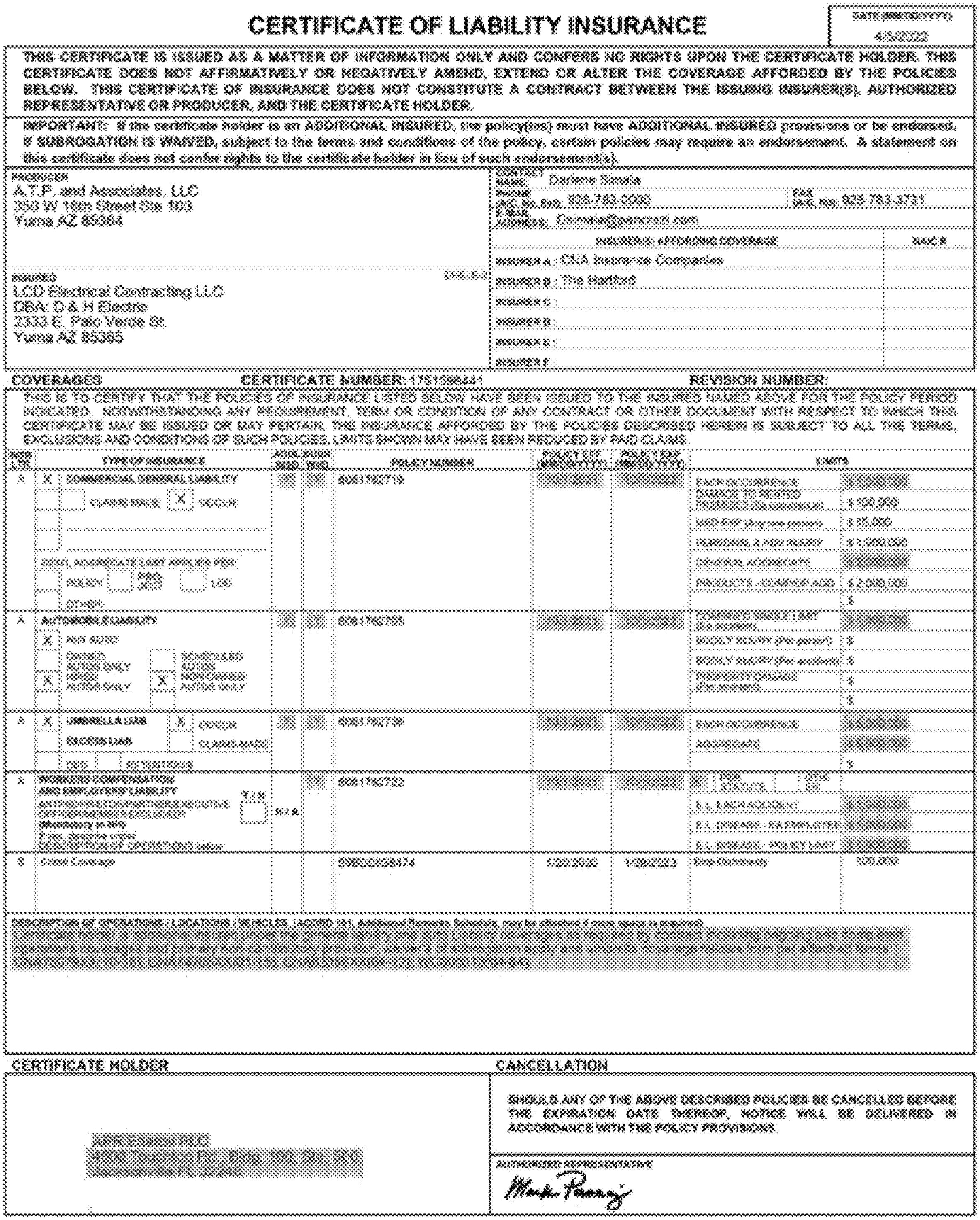

CERTIFICATE OF LIABILITY INSURANCE

DATE (MM/DD/YYYY) 4/5/2022

THIS CERTIFICATE IS ISSUED AS A MATTER OF INFORMATION ONLY AND CONFERS NO RIGHTS UPON THE CERTIFICATE HOLDER. THIS CERTIFICATE DOES NOT AFFIRMATIVELY OR NEGATIVELY AMEND, EXTEND OR ALTER THE COVERAGE AFFORDED BY THE POLICIES BELOW. THIS CERTIFICATE OF INSURANCE DOES NOT CONSTITUTE A CONTRACT BETWEEN THE ISSUING INSURER(S), AUTHORIZED REPRESENTATIVE OR PRODUCER, AND THE CERTIFICATE HOLDER.

IMPORTANT: If the certificate holder is an ADDITIONAL INSURED, the policy(ies) must have ADDITIONAL INSURED provisions or be endorsed. If SUBROGATION IS WAIVED, subject to the terms and conditions of the policy, certain policies may require an endorsement. A statement on this certificate does not confer rights to the certificate holder in lieu of such endorsement(s).

PRODUCER
A.T.P. and Associates, LLC
350 W 16th Street Ste 103
Yuma AZ 85364

CONTACT NAME: Darlene Simala
PHONE (A/C, No, Ext): 928-783-0000
FAX (A/C, No): 928-783-3731
E-MAIL ADDRESS: Dsimala@pancrazi.com

| INSURER(S) AFFORDING COVERAGE | NAIC # |
|---|---|
| INSURER A : CNA Insurance Companies | |
| INSURER B : The Hartford | |
| INSURER C : | |
| INSURER D : | |
| INSURER E : | |
| INSURER F : | |

INSURED
LCD Electrical Contracting LLC
DBA: D & H Electric
2333 E. Palo Verde St.
Yuma AZ 85365

COVERAGES CERTIFICATE NUMBER: 1751598441 REVISION NUMBER:

THIS IS TO CERTIFY THAT THE POLICIES OF INSURANCE LISTED BELOW HAVE BEEN ISSUED TO THE INSURED NAMED ABOVE FOR THE POLICY PERIOD INDICATED. NOTWITHSTANDING ANY REQUIREMENT, TERM OR CONDITION OF ANY CONTRACT OR OTHER DOCUMENT WITH RESPECT TO WHICH THIS CERTIFICATE MAY BE ISSUED OR MAY PERTAIN, THE INSURANCE AFFORDED BY THE POLICIES DESCRIBED HEREIN IS SUBJECT TO ALL THE TERMS, EXCLUSIONS AND CONDITIONS OF SUCH POLICIES. LIMITS SHOWN MAY HAVE BEEN REDUCED BY PAID CLAIMS.

| INSR LTR | TYPE OF INSURANCE | ADDL INSD | SUBR WVD | POLICY NUMBER | POLICY EFF (MM/DD/YYYY) | POLICY EXP (MM/DD/YYYY) | LIMITS | |
|---|---|---|---|---|---|---|---|---|
| A | X COMMERCIAL GENERAL LIABILITY; CLAIMS-MADE X OCCUR; GEN'L AGGREGATE LIMIT APPLIES PER: POLICY PRO-JECT LOC; OTHER: | [redacted] | [redacted] | 6061782719 | [redacted] | [redacted] | EACH OCCURRENCE | [redacted] |
| | | | | | | | DAMAGE TO RENTED PREMISES (Ea occurrence) | $ 100,000 |
| | | | | | | | MED EXP (Any one person) | $ 15,000 |
| | | | | | | | PERSONAL & ADV INJURY | $ 1,000,000 |
| | | | | | | | GENERAL AGGREGATE | [redacted] |
| | | | | | | | PRODUCTS - COMP/OP AGG | $ 2,000,000 |
| | | | | | | | | $ |
| A | AUTOMOBILE LIABILITY; X ANY AUTO; OWNED AUTOS ONLY; SCHEDULED AUTOS; X HIRED AUTOS ONLY; X NON-OWNED AUTOS ONLY | [redacted] | [redacted] | 6061782705 | [redacted] | [redacted] | COMBINED SINGLE LIMIT (Ea accident) | [redacted] |
| | | | | | | | BODILY INJURY (Per person) | $ |
| | | | | | | | BODILY INJURY (Per accident) | $ |
| | | | | | | | PROPERTY DAMAGE (Per accident) | $ |
| | | | | | | | | $ |
| A | X UMBRELLA LIAB X OCCUR; EXCESS LIAB CLAIMS-MADE; DED RETENTION $ | [redacted] | [redacted] | 6061782736 | [redacted] | [redacted] | EACH OCCURRENCE | [redacted] |
| | | | | | | | AGGREGATE | [redacted] |
| | | | | | | | | $ |
| A | WORKERS COMPENSATION AND EMPLOYERS' LIABILITY; ANY PROPRIETOR/PARTNER/EXECUTIVE OFFICER/MEMBER EXCLUDED? (Mandatory in NH) Y / N; If yes, describe under DESCRIPTION OF OPERATIONS below | N / A | [redacted] | 6061782722 | [redacted] | [redacted] | [redacted] PER STATUTE OTH-ER | |
| | | | | | | | E.L. EACH ACCIDENT | [redacted] |
| | | | | | | | E.L. DISEASE - EA EMPLOYEE | [redacted] |
| | | | | | | | E.L. DISEASE - POLICY LIMIT | [redacted] |
| B | Crime Coverage | | | 59BDDGS8474 | 1/28/2020 | 1/28/2023 | Emp Dishonesty | 100,000 |

DESCRIPTION OF OPERATIONS / LOCATIONS / VEHICLES (ACORD 101, Additional Remarks Schedule, may be attached if more space is required)
[redacted]

CERTIFICATE HOLDER
[redacted]

CANCELLATION
SHOULD ANY OF THE ABOVE DESCRIBED POLICIES BE CANCELLED BEFORE THE EXPIRATION DATE THEREOF, NOTICE WILL BE DELIVERED IN ACCORDANCE WITH THE POLICY PROVISIONS.

AUTHORIZED REPRESENTATIVE

FIG. 1

COMPUTING SYSTEM AND METHOD FOR STRUCTURING UNSTRUCTURED DOCUMENT DATA

CROSS-REFERENCES TO RELATED APPLICATION

This application is continuation of U.S. patent application Ser. No. 19/223,986, filed May 30, 2025 entitled "COMPUTING SYSTEM AND METHOD FOR STRUCTURING UNSTRUCTURED DOCUMENT DATA", which is hereby incorporated by reference in their entirety.

FIELD OF TECHNOLOGY

The present disclosure generally relates to structuring unstructured document data using advanced document artificial intelligence (AI) techniques, and more particularly relates to computing systems and methods for transforming unstructured document data into a machine-readable format and employing advanced computer vision and machine learning (ML) techniques to extract key entities from the machine-readable text.

BACKGROUND

Contractor workers face significantly higher risks, with recordable injury and illness rates 36% to 72% higher than full-time employees. Additionally, 37% of all temporary workers are employed in high-risk industrial sectors, highlighting the urgent need for better safety and compliance solutions. As regulatory demands and workforce safety concerns continue to grow, organizations need reliable, scalable, and intelligent solutions to ensure contractor compliance, especially in safety-critical industries such as manufacturing, pharmaceuticals, chemicals, and food, and beverage. A critical but often cumbersome aspect of contractor compliance and safety management is Certificate of Insurance (COI) document reviews. According to certain research, manual COI verification is time-consuming, expensive, and error-prone, with staff spending approximately 15-20 minutes per document, which often leads to backlogs and delays in contractor onboarding. Organizations working with numerous contractors typically process hundreds or thousands of COIs annually, creating significant administrative burden. It has been reported that inconsistent COI review processes create significant compliance risks when manual reviews miss critical details like coverage limits, exclusions, or expiration dates. It is noted that maintaining proper documentation of insurance verification creates challenges for regulatory compliance and increases liability exposure during incidents.

Accordingly, there is a need for an improved computing system and method for automating the identification and extraction of key entities from COI documents.

SUMMARY

Among other features, the present disclosure relates to a computing system and method (e.g., AI/ML based) that is not only highly accurate (e.g., >98% accuracy on test dataset containing 3k documents), which reduces compliance risks, but also more efficient (e.g., ~7× faster than manual reviews), enabling real-time verification during contractor onboarding, eliminating backlogs during high-volume contractor intake periods, comprehensive audit trails, and better resource optimization where safety personnel can focus on high-value safety activities rather than administrative tasks.

In one aspect, the present disclosure relates to a system deployed within a communication network, the system comprising: a computing device deployed within the communication network, comprising: a non-transitory computer-readable storage medium configured to store an application program; and a processor coupled to the non-transitory computer-readable storage medium and configured to control a plurality of modules to execute instructions of the application program to obtain an input in a portable document format (PDF) via a first user interface element of the application program. The system may further comprise a computing server system configured to: receive the input from the computing device via a first application programming interface (API) call, determine a plurality of entities to be identified and retrieved from the input, analyze each entity to determine a plurality of identification and retrieval computational techniques, group the plurality of entities into different categories based on the plurality of identification and retrieval computational techniques, generate multiple images of the input in different dot per inches (DPIs), extract machine-readable texts from the multiple images of the input, conduct a text extraction for native PDF in the input, apply a first portion of the plurality of identification and retrieval computational techniques to identify and retrieve a first category of the plurality of entities based at least upon the machine-readable texts extracted from the multiple images of the input, apply a second portion of the plurality of identification and retrieval computational techniques to identify and retrieve a second category of the plurality of entities based at least upon a selected image of the multiple images, apply a third portion of the plurality of identification and retrieval computational techniques to identify and retrieve a third category of the plurality of entities based at least upon the selected image of the multiple images and the native PDF in the input, and save processing results of the plurality of identification and retrieval computational techniques in identifying and retrieval of each of the plurality of entities in at least one structured database.

In some embodiments, the plurality of images of the input in different DPIs may include a first image with 200 DPI, a second image with 400 DPI, and a third image with 500 DPI. The selected image of the multiple images may include the first image with 200 DPI. In an embodiment, the first portion of the plurality of identification and retrieval computational techniques may include at least one rule-based system using a label-value techniques in identifying and retrieving the first category entities from the input based at least upon the machine-readable texts extracted from the multiple images of the input.

In another embodiment, the second portion of the plurality of identification and retrieval computational techniques may include a plurality of binary classifiers configured to detect a presence of each of the second category entities in the input based at least upon the selected image of the multiple images.

In yet another embodiment, the third portion of the plurality of identification and retrieval computational techniques may include at least one computer vision object detection machine learning model configured to identify an area in the selected image of the multiple images and the native PDF containing information relating to the third category entities, and at least one generative artificial intelligence model configured to extract the information from the area.

In additional embodiments, the at least one structured database may include at least one relational database deployed within the communication network. The computing server system may be further configured to transmit, via a second API call, the processing results of the plurality of identification and retrieval computational techniques in identifying and retrieval of each of the plurality of entities to an application program downloaded and stored on the computing device.

In further embodiments, the processor of the computing device may be further configured to control the plurality of modules to execute instructions of the application program to display the processing results of each of the plurality of entities via a second user interface element of the application program.

Additionally, the computing server system may be configured to extract the machine-readable texts from the multiple images of the input using optical character recognition techniques.

In accordance with another aspect, the present disclosure relates to a computer-implemented method, comprising: obtaining, by a processor of a computing device deployed within a communication network, an input in a portable document format (PDF) via a first user interface element of the application program; receiving, by a computing server system deployed within the communication network, the input from the computing device via a first application programming interface (API) call; determining, by the computing server system, a plurality of entities to be identified and retrieved from the input; analyzing, by the computing server system, each entity to determine a plurality of identification and retrieval computational techniques; grouping, by the computing server system, the plurality of entities into different categories based on the plurality of identification and retrieval computational techniques; generating, by the computing server system, multiple images of the input in different dot per inches (DPIs); extracting, by the computing server system, machine-readable texts from the multiple images of the input; conducting, by the computing server system, a text extraction for native PDF in the input; applying, by the computing server system, a first portion of the plurality of identification and retrieval computational techniques to identify and retrieve a first category of the plurality of entities based at least upon the machine-readable texts extracted from the multiple images of the input; applying, by the computing server system, a second portion of the plurality of identification and retrieval computational techniques to identify and retrieve a second category of the plurality of entities based at least upon a selected image of the multiple images; applying, by the computing server system, a third portion of the plurality of identification and retrieval computational techniques to identify and retrieve a third category of the plurality of entities based at least upon the selected image of the multiple images and the native PDF in the input; and saving, by the computing server system, processing results of the plurality of identification and retrieval computational techniques in identifying and retrieval of each of the plurality of entities in at least one structured database.

In accordance with yet another aspect, the present disclosure relates to a non-transitory computer-readable medium comprising computer program instructions executable by one or more processors to perform a method, the method comprising: obtaining, by a processor of a computing device deployed within a communication network, an input in a portable document format (PDF) via a first user interface element of the application program; receiving, by a computing server system deployed within the communication network, the input from the computing device via a first application programming interface (API) call; determining, by the computing server system, a plurality of entities to be identified and retrieved from the input; analyzing, by the computing server system, each entity to determine a plurality of identification and retrieval computational techniques; grouping, by the computing server system, the plurality of entities into different categories based on the plurality of identification and retrieval computational techniques; generating, by the computing server system, multiple images of the input in different dot per inches (DPIs); extracting, by the computing server system, machine-readable texts from the multiple images of the input; conducting, by the computing server system, a text extraction for native PDF in the input; applying, by the computing server system, a first portion of the plurality of identification and retrieval computational techniques to identify and retrieve a first category of the plurality of entities based at least upon the machine-readable texts extracted from the multiple images of the input; applying, by the computing server system, a second portion of the plurality of identification and retrieval computational techniques to identify and retrieve a second category of the plurality of entities based at least upon a selected image of the multiple images; applying, by the computing server system, a third portion of the plurality of identification and retrieval computational techniques to identify and retrieve a third category of the plurality of entities based at least upon the selected image of the multiple images and the native PDF in the input; and saving, by the computing server system, processing results of the plurality of identification and retrieval computational techniques in identifying and retrieval of each of the plurality of entities in at least one structured database.

The above simplified summary of example aspects serves to provide an understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 1 illustrates an Association for Cooperative Operations Research and Development (ACORD) 25 form with a number of highlighted entities.

DETAILED DESCRIPTION

Figure 2:
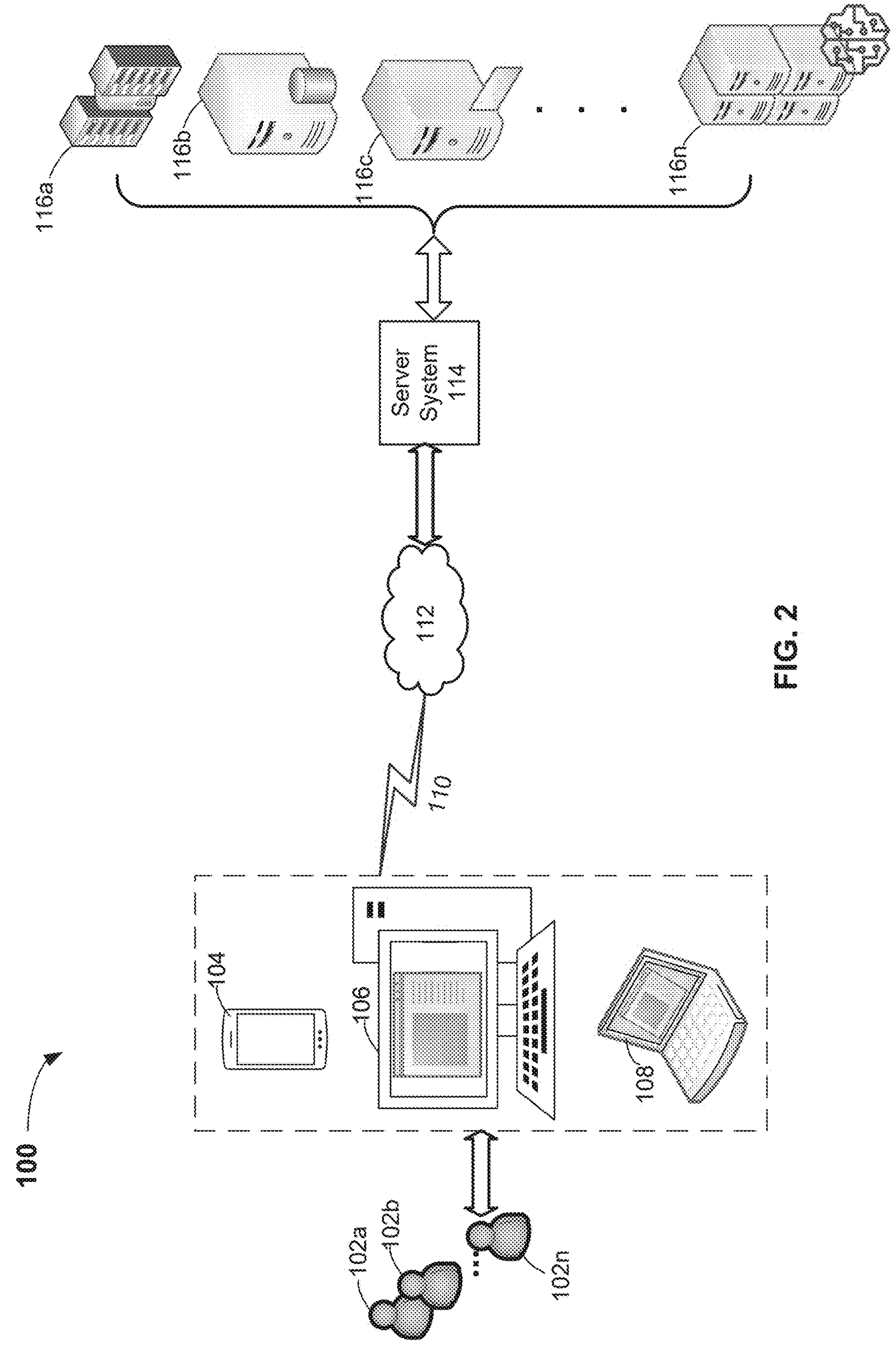
FIG. 2 illustrates a diagram of a computing system for transforming unstructured document data into a machine-readable format and employing advanced document AI/ML techniques to extract key entities from the machine-readable text, according to an exemplary aspect of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

A COI document review is a critical process in contractor compliance and safety management. It ensures that contractors, vendors, and subcontractors maintain appropriate insurance coverage before they begin work on a project. This process may protect the hiring entity (e.g., a general contractor, property owner, or company) from financial and legal risks associated with third-party liabilities, workplace injuries, and property damage.

For example, a COI document review may facilitate risk mitigation and liability protection by ensuring that contractors have valid insurance to cover potential liabilities (e.g., workplace accidents, damage to property, or third-party claims). Such a review process may protect the hiring company from lawsuits and financial losses due to uninsured or underinsured contractors.

From a regulatory and contractual compliance perspective, a COI document review may verify that insurance coverage meets the contractual requirements and legal regulations, thereby ensuring that policy limits, coverage types, and endorsements align with industry standards and project-specific needs.

Workplace safety and financial security is another function for a COI document review which may ensure contractors have workers' compensation insurance to cover employee injuries and medical expenses. For example, the COI document review may verify general liability insurance to protect against third-party bodily injury or property damage claims, confirm automobile liability insurance if vehicles are used on the project, check umbrella or excess liability coverage when required.

Furthermore, a proper COI document review may minimize project disruptions and delays by avoiding project shutdowns due to non-compliant contractors and preventing costly penalties from regulatory agencies for failing to maintain proper insurance.

Generally, during a COI document review process, contractors may initially submit a COI issued by their insurance provider before starting work. The COI should list the hiring entity as a certificate holder and include required policy details. Subsequently, verification of key insurance details may be carried out to confirm policy validity (e.g., active coverage, effective and expiration dates), check coverage types and policy limits against contract requirements, and verify endorsements such as additional insured to ensure the hiring company is covered under the contractor's policy, waiver of subrogation to prevent the insurer from recovering costs from the hiring company, and primary and non-contributory clause to ensure the contractor's insurance is the first to pay claims.

Discrepancy resolution may be a part of the COI document review process which may identify missing, expired, or insufficient coverage, and request revisions or updated documentation from the contractor or their insurance provider.

As a result, a COI document process may approve contractors who meet requirements, flag or restrict non-compliant contractors, and set up a tracking system to monitor expiration dates and request renewals.

A manual COI document review process is often time-consuming, error-prone, and inefficient. For example, large organizations may deal with hundreds or thousands of COIs from multiple contractors and vendors, and reviewing each document manually requires significant time and effort, increasing administrative workload. Insurance documents contain complex terms, policy numbers, and varying formats, making errors likely. Common mistakes include missing coverage details, overlooking endorsements, or failing to check policy expiration dates. Misinterpretation of legal or insurance jargon can lead to non-compliance risks. Moreover, different reviewers may interpret insurance requirements differently, leading to inconsistencies. Without standardized processes, some COIs might be accepted despite missing critical coverage, while others may be rejected unnecessarily. Keeping track of policy expiration dates manually is difficult, increasing the risk of working with uninsured contractors. Lack of automated alerts means expired policies may go unnoticed until an issue arises.

Additionally, COIs come in different formats depending on the insurer, making it difficult to standardize reviews. Handwritten or low-quality scanned COIs may be illegible, increasing verification challenges. Reviewing, flagging issues, requesting corrections, and waiting for updated documents can take days or even weeks. Project start dates may be delayed due to slow insurance compliance approvals. Checking for essential endorsements such as additional insured, waiver of subrogation, and primary and non-contributory status requires careful attention. Some COIs may list these endorsements in different locations or require additional documentation, increasing complexity. A missed coverage gap or incorrect approval can expose the hiring company to financial liabilities and lawsuits. Non-compliant contractors may lead to regulatory penalties or violations.

Among other features, the present disclosure relates to AI/ML-based COI review computing system and method which may be configured to achieve an intelligent data extraction. Traditional automation approaches typically struggle with variations in formats, fonts, and layouts from different insurers. Human intervention may be necessary when fields are misread or missing. By contrast, the present disclosure may employ advanced natural language processing (NLP) techniques and deep learning to accurately extract key details from any COI format, even if they are drafted differently. Further, the self-learning capabilities of the computing system and method of the present disclosure may improve accuracy over time as more COIs are processed. Minor formatting errors may be detected and corrected automatically.

In accordance with aspects, the present disclosure improves upon computer vision for document classification and structure analysis and enhances communication networking within organizations and across contractor ecosystems. For example, the computing system of the present disclosure may integrate with compliance management platforms, automatically notifying contractors, vendors, and compliance teams when issues are detected (e.g., expired policies, missing endorsements). This may reduce email overload by ensuring only relevant parties receive critical updates. One or more AI/ML models trained, hosted, or applied by the present disclosure may also be configured to prioritize issues based on risk level, ensuring urgent cases get routed to the right compliance officer faster, thereby reducing bottlenecks in the approval process by intelligently distributing workload. According to some embodiments, the computing system of the present disclosure may integrate with Cloud-based communication platforms (e.g., project management tools such as Procore, Oracle Aconex, SAP) via an application programming interface (API) and facilitate cross-departmental communication between procurement, legal, and safety teams. Real-time data sharing among different teams may enable instant access to COI compliance status, eliminating manual follow-ups between stakeholders.

In an alternate embodiment, chatbots and AI powered virtual assistants may be contemplated by the present disclosure. ML driven chatbots may answer contractor inquiries about COI requirements, missing documents, or renewal deadlines, thereby reducing delays in compliance approvals by guiding contractors through corrections in real time. ML models with NLP may enable multilingual support, helping diverse contractor networks understand compliance requirements without miscommunication.

According to some embodiments, COI documents generally follow the Association for Cooperative Operations Research and Development (ACORD) 25 template, which is a standardized document used in the insurance industry to provide evidence of liability insurance coverage, typically issued by insurance companies or agents to policyholders. As will be described fully below, the disclosed computing system and method of the present disclosure may be configured to extract information from obtained COI documents and transform extracted information for downstream structuring and parsing using e.g., computer vision, and document AI/ML techniques. FIG. 1 shows a sample Acord 25 form and a number of highlighted entities (e.g., 27 entities) that the computing system of the present disclosure may be configured to identify, extract and analyze.

According to some embodiments, FIG. 2 illustrates a diagram of a computing system 100, deployed within a computing environment and communication network, for receiving data related to COI documents or reviews as inputs, converting unstructured COI document contents into structured data representations via a number of selected computer vision, ML, and AI techniques, and parsing the structured data representations to identify and extract key entities from the COI documents.

In one embodiment, a user 102*a*, 102*b*, . . . 102*n* may use a selected computing device or system 104, 106, 108 to input data related a COI review (e.g., an Acord 25 form as shown in FIG. 1), which may be transmitted to a server system 114, using suitable communication protocol(s) 110 and at least one communication network 112. The communication network 112 may generally include a geographically distributed collection of computing devices or data points interconnected by communication links and segments for transporting signals and data therebetween. The communication protocol(s) 110 may generally include a set of rules defining how computing devices and networks may interact with each other, such as frame relay, Internet protocol (IP), transmission control protocol (TCP), user datagram protocol (UDP), hypertext transfer protocol (HTTP). It should be appreciated that the computing system 100 of the present disclosure may use any suitable communication network, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network.

The server system 114 may be configured to train, host, incorporate, integrate, and/or make an API call to at least one of a plurality of computing systems 116*a*, 116*b*, 116*c*, . . . 116*n* to process data related to COI for COI review purposes. In a preferred embodiment, the plurality of computing systems 116*a*, 116*b*, 116*c*, . . . 116*n* may include one or more generative AI models and machine learning models that may be or have been trained for processing received natural language user instructions and/or COI related data. Generative AI may generally refer to a class of AI systems designed to generate new content, such as text, images, music, code, and more, based on patterns and inputs it has learned. Generative AI models may generate in multiple modalities, including but not limited to text (e.g., Anthropic, Open AI, Google DeepMind, Mistral, Meta, Cohere), images (e.g., DALL·E, Stable Diffusion), audio (e.g., Jukebox by OpenAI), and video (e.g., Runway ML). The generative AI models disclosed in the present disclosure may be built on various architectures like transformers, Generative Adversarial Networks (GANs), and diffusion models.

In various embodiments, the plurality of computing systems 116*a*, 116*b*, 116*c*, . . . 116*n* may include one or more large language models (LLMs) or simply language models which are a subset of AI models specifically focused on understanding, generating, and interacting with natural language. They use large-scale neural networks trained on massive text datasets. The term "large" refers to the size of these models in terms of the number of parameters or weights, which are the values that the model learns during training to make predictions and generate text. LLMs may have millions, billions (or even more) parameters, which enable such models to capture complex patterns and nuances in language that, in turn, allow these models to understand and generate more natural-sounding text (relative to previous approaches). Examples of LLMs include the generative pre-trained transformer models (e.g., Anthropic's Claude, GPT-4, Codex), Pathways Language Model (PaLM), Gemini, Language Model for Dialogue Applications (LaMDA), Bard, Large Language Model Meta Artificial Intelligence (LLaMA), Claude, Orca, Turing-NLG, Command R, Mistral, Mixtral, Grok, BigScience Large Open-science Open-access Multilingual Language Model (BLOOM), Luminous, Titan, Tongyi Qianwen, Enhanced Representation through Knowledge Integration (ERNIE), PanGu, NeMo, XGen, StableLM, Character LLM, and even non-generative examples such as bidirectional encoder representations from Transformers (BERT), etc.

In some embodiments, the server system 114 may be Cloud-based or an on-site server. The term "server" generally refers to a computing device or system, including processing hardware and process space(s), an associated computer readable storage medium such as a memory device or database, and, in some instances, at least one database application as is well known in the art. The server system 114 may provide functionalities for any connected devices such as sharing data or provisioning resources among multiple client devices, or performing computations for each connected client device. According to one embodiment, within a Cloud-based computing architecture, the server system 114 may provide various Cloud computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), computing/processing devices (servers, central processing units (CPUs), graphics processing units (GPUs), random access memory, caches, etc.), and storage devices (e.g., network attached storages, storage area network devices, hard disk drives, solid-state devices, etc.). In addition, such resources may be used to support virtual networks, virtual machines, databases, applications, etc. The term "storage device" or "database," as used herein, may refer to a database (e.g., relational database management system (RDBMS) or structured query language (SQL) database), or may refer to any other data structure, such as, for example a comma separated values (CSV), tab-separated values (TSV), JavaScript Object Notation (JSON), extendible markup language (XML), TEXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

Cloud computing resources accessible using any suitable communication network (e.g., Internet) may include a private Cloud, a public Cloud, and/or a hybrid Cloud. Here, a private Cloud may be a Cloud infrastructure operated by an enterprise for use by the enterprise, while a public Cloud may refer to a Cloud infrastructure that provides services and resources over a network for public use. In a hybrid Cloud computing environment, which uses a mix of on-premises, private Cloud and third-party, public Cloud services with orchestration between the two platforms, data and applications may move between private and public Clouds for greater flexibility and more deployment options. Some example public Cloud service providers may include Amazon (e.g., Amazon Web Services® (AWS)), IBM (e.g., IBM Cloud), Google (e.g., Google Cloud Platform), and Microsoft (e.g., Microsoft Azure®). These providers provide Cloud services using computing and storage infrastructures at their respective data centers and access thereto is generally available via the Internet. Some Cloud service providers (e.g., Amazon AWS Direct Connect and Microsoft Azure ExpressRoute) may offer direct connect services and such connections typically require users to purchase or lease a private connection to a peering point offered by these Cloud providers.

In one embodiment, an application, which may include a mobile or web-based application (e.g., native iOS or Android Apps), may be downloaded and installed on the selected computing device or system 104, 106, or 108 for interacting with each user 102*a*, 102*b* 102*n* which includes but not limited to individuals or teams responsible for reviewing COIs, system/network administrators, software developers, and other end-users. In some embodiments, the user 102*a*, 102*b*, . . . 102*n* may upload files or pictures related to one or more COI documents via a user interface element of the application, or directly take one or more pictures of at least one COI document via a camera associated with the selected computing device or system 104, 106, 108 and send the pictures to the server system 114 via the application (e.g., via the communication protocol(s) 110 and communication network 112) when external processing may be needed.

User 102*a*, 102*b* . . . 102*n* may be professionals in risk management and insurance department of certain organizations who understand coverage types, limits, and exclusions and conduct COI reviews to ensure third parties (vendors, contractors, tenants, etc.) meet contractual insurance requirements. Legal teams and professionals are often involved in contract language related to insurance requirements. They may review COIs for compliance with indemnity clauses or additional insured provisions and may support risk management rather than handle the full review. Project managers or construction managers for e.g., construction or development projects may conduct first-pass COI reviews for timeliness or completeness (e.g., whether a vendor submitted a COI or not) and flag issues but defer technical review to other professionals who are responsible for risk management or legal issues. Certain procurement or vendor management teams may be involved when COIs are required from vendors or service providers and they are often responsible for collecting and tracking COIs but may not be qualified to interpret coverage. Moreover, third party COI tracking services may be user 102*a*, 102*b* . . . 102*n*. Automated agents, scripts, playback software, and the like acting on behalf of one or more people may also be user 102*a*, 102*b* . . . 102*n*. Such a user-facing application of the computing system 100 may include a plurality of modules and libraries executed and controlled by the microcontroller or processor of the hosting computing device or system 104, 106, 108 for performing functions locally on each computing device and/or making remote calls (e.g., API calls) to the server system 114 to access specific functionalities. The division of labor between local execution and server-side operations depends on how each module or library is designed and what its functions require.

According to some implementations, one or more libraries downloaded on the selected computing device or system 104, 106, 108 may be configured to perform all their operations locally without relying on the server system 114. That is, once a library is installed, it may access the resources and computing power available on each computing device or system 104, 106, 108 to execute tasks. For example, certain libraries may be configured to perform computations locally using each computing device's CPU/GPU. Further, file handling libraries may be configured to process files stored on the local device. If pre-trained AI or machine learning models are included in the library, they may run locally, depending on each device's capabilities. Local execution of these libraries may not require e.g., Internet connection. Since there is no network latency, execution is faster for these local operations. Further, there is a greater control over data privacy, since no data needs to be sent to an external server. However, limited by each device's hardware (e.g., memory, processing power), local execution may involve downloading potentially large libraries, models, or datasets.

According to another embodiment, remote execution (server-side processing) may be implemented, and libraries downloaded on each computing device or system 104, 106, 108 may make remote calls (e.g., API calls) to the server system 114 to access certain functionalities, for example, when the functions a library provides are too resource-intensive for local execution or require access to constantly updated data (e.g., real-time services, large-scale models, or databases). In this case, the library acts as a client-side interface that makes API requests to the server system 114 to perform specific tasks.

In one example, a library may interface with services like OpenAI's GPT, Google Cloud AI, Claude Sonnet, or Amazon S3, where the computation may be carried out on the server system 114, and the selected computing device or system 104, 106, 108 sends requests and receives results. In another example, libraries like AWS SDK, Google Cloud SDK may allow interaction with Cloud storage to upload, retrieve, and manipulate data on the Cloud.

Server-side processing may offload heavy computation to powerful servers (e.g., at least one of a plurality of computing systems 116*a*, 116*b*, 116*c*, . . . 116*n*), provide access to real-time data and updated services, and being device-agnostic by working even on devices with limited resources (smartphones, tablets, etc.).

According to additional embodiments, libraries implemented on each selected computing device or system 104, 106, 108 may adopt a hybrid model, where some operations or computations may be performed locally, while more complex or resource-intensive tasks are offloaded to the server system 114. For example, basic computations, pre-processing, or user interface elements may be handled locally, while complex processing, data retrieval, or heavy computations (e.g., running large AI models and LLMs, or interacting with databases) may be carried out via the server system 114.

Figure 3:
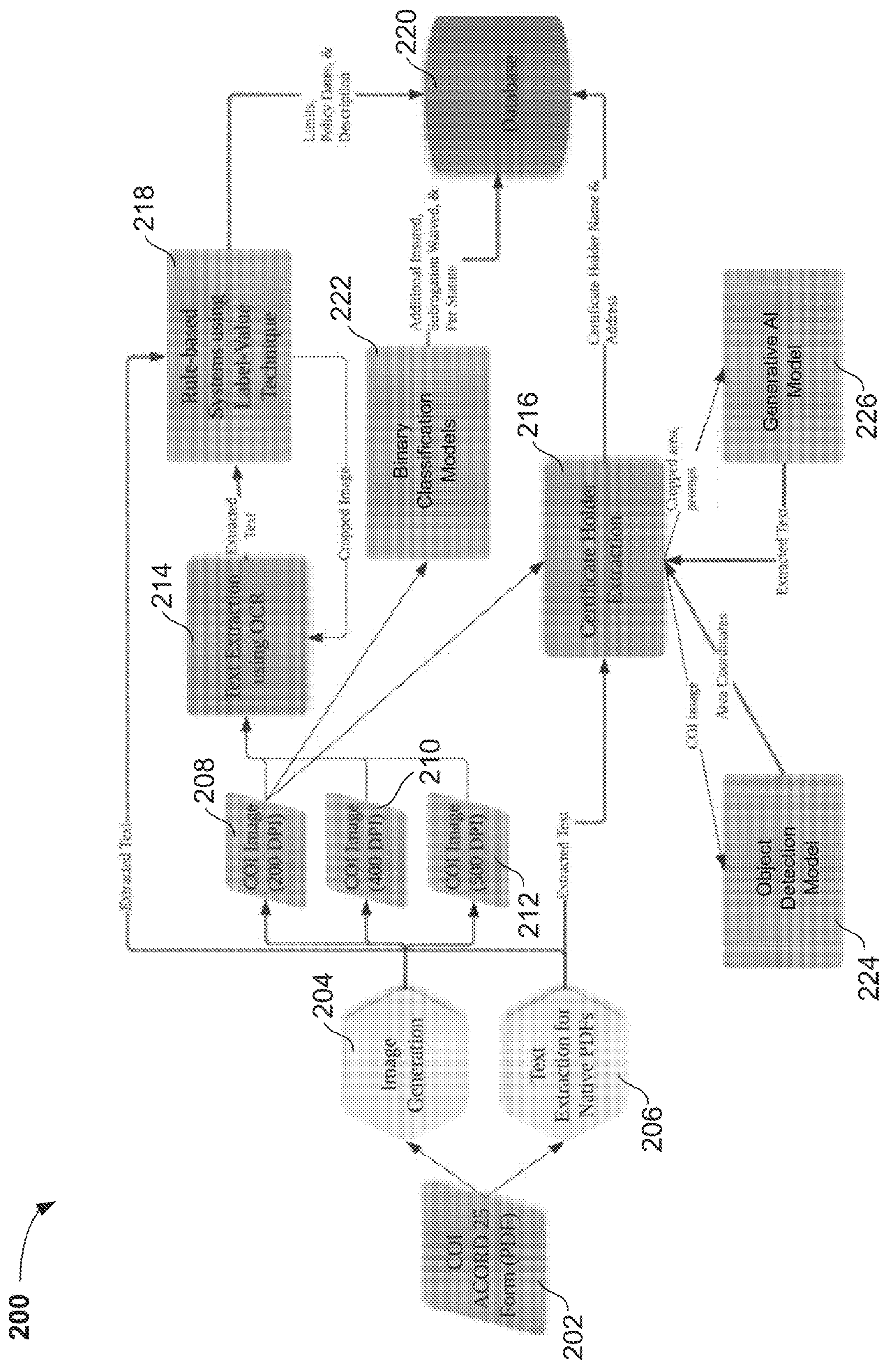
FIG. 3 illustrates a workflow carried out by the computing system of FIG. 2, according to an exemplary aspect of the present disclosure.

In accordance with aspects, FIG. 3 illustrates an example multi-stage workflow or pipeline 200 carried out by the computing system 100 of the present disclosure. Upon receiving an input 202 in the portable document format (PDF) (e.g., an ACORD 25 form in PDF for COI purposes), the computing system 100 may be configured to conduct image generation 204 and text extraction for native PDFs 206. In an embodiment, multiple images of the input 202 may be generated in different DPIs. DPI, or dots per inch, refers to the number of printed dots contained within one inch of an image printed by a printer. DPI represents the print density of an image, i.e., how many physical dots will be printed per inch of paper or rendered physically. It is not the resolution itself, but rather a scaling factor used when mapping a digital image to a physical size (e.g., on paper). If an image is saved at 300 DPI, it will be printed at 10 inches×8 inches on paper.

As shown in FIG. 3, the outputs of the image generation 204 may include a first COI image with 200 DPI 208, a second COI image with 400 DPI 210, and a third COI image with 500 DPI 212. It should be appreciated that the DPI for each generated COI image may be customized in accordance with specific implementation requirements. Meanwhile, in performing the text extraction for native PDFs 206, the computing system 100 may use a combination of computer vision and AI/ML techniques. A native PDF generally refers to a PDF file that was created digitally from a source like a Word document, Excel spreadsheet, or another digital format, rather than being scanned from a physical piece of paper. A native PDF may be more compact (smaller file size) than scanned PDFs and may include selectable and searchable text, so one can highlight, copy, and search certain text because it is recognized as actual text, not just an image. A native PDF may have better quality and be editable to some extent. That is, the text and graphics of a native PDF may be crisp and scalable, one can edit it using PDF editors like e.g., Adobe Acrobat or even Word. Native PDFs are not inherently structured in the way that formats like JSON or XML are. A native PDF may contain text objects with font, position, and layout information, thereby containing low-level visual layout and positional information (e.g., positioned text elements (characters, words) with associated coordinates (x, y), fonts, and styles) that can be programmatically leveraged to reconstruct structure and making them readable by text parsers. A native PDF may also include metadata (title, author, etc.), tagged content (e.g., in some well-structured PDFs, for accessibility purposes), and tables and form fields though often not semantically marked as such. However, native PDFs may lack true semantic structure (e.g., "this is a name," "this is a date"), reliable hierarchy (e.g., sections, paragraphs, headers), and standardized field labels or data relationships. In other words, a native PDF does not contain structured data in a formal or semantic sense. It contains visual layout data (text and coordinates) from which structure can be inferred, but that structure is not inherent to a native PDF.

On the other hand, a scanned PDF may be a raster image embedded inside a PDF container, which usually has a larger file size and potentially lower clarity. Since a scanned PDF is created by scanning physical documents, it captures pixels only, not machine-readable text or structure. By default, scanned PDFs are unstructured representations of documents. A scanned PDF may require certain character recognition techniques to process its text into searchable or selectable text. Generally, a scanned PDF has no semantic structure (no headings, paragraphs, or tables recognized), no selectable text, unless optical character recognition (OCR) technique has been applied, no embedded tags or metadata describing fields or entities, and no inherent data hierarchy or relationships.

Generally, both native PDFs and scanned PDFs may be considered to contain unstructured data because they lack explicit semantic labeling or relational structures. Native PDFs store text as positioned elements without embedded relationships. Scanned PDFs contain only pixel-based images, requiring certain computer vision techniques to recover any text at all.

According to some embodiments, the entities to be extracted from a received COI document may be grouped into the following 3 categories based on different methods used to extract them. In one embodiment, an entity of the first category may have a label or identifier vertically aligned to it (e.g., roughly in the same horizontal section of the document). The second category may contain binary entities which have two possible values. The third category contains information which is present at a specific location in the document and has some labels around it which can be used to identify its location.

A first example category of entities may include the Each Occurrence and General Aggregate limits for Commercial General Liability; Combined Single Limit for Automobile Liability; Each Occurrence and Aggregate limits for Umbrella & Excess Liability; E.L. Each Accident, E.L. Disease—EA Employee, E.L. Disease—Policy Limit; Policy Effective and Expiry Dates for all types of liabilities;

and Description of Operations/Locations/Vehicles. In some embodiments, the first example category of entities may include 17 entities. To extract these entities, according to one implementation, the computing system 100 may first apply at least one computer vision machine learning technique (e.g., OCR) to extract the text from the generated images of the PDFs (both native and scanned) and then employ rule-based systems using a label-value technique to extract each of the entities, as will be described fully below.

A second example category of entities may include Additional Insured and Subrogation Waived for all types of liabilities, and the Per Statute for Workers Compensation and Employers' Liability. In some embodiments, Additional Insured for Workers Compensation may always be "N/A." The second example category of entities may include 8 entities, in one embodiment. To extract each of these 8 entities, according to one implementation, the computing system 100 may be configured to use at least 8 computer vision machine learning binary classification models trained for the task of identifying whether each of the entities are selected or present or not in the images of the PDFs.

A third example category of entities may include 2 entities: the Certificate Holder Name and Address. To extract each entity, according to one implementation, the computing system 100 may be configured to use a combination of at least one rule-based system using the label-value technique, a computer vision object detection machine learning model trained for the task of identifying the area containing the certificate holder information in the image of the PDF, and use at least one AI model (e.g., a generative AI model) to extract the information from the identified area.

Figure 4:
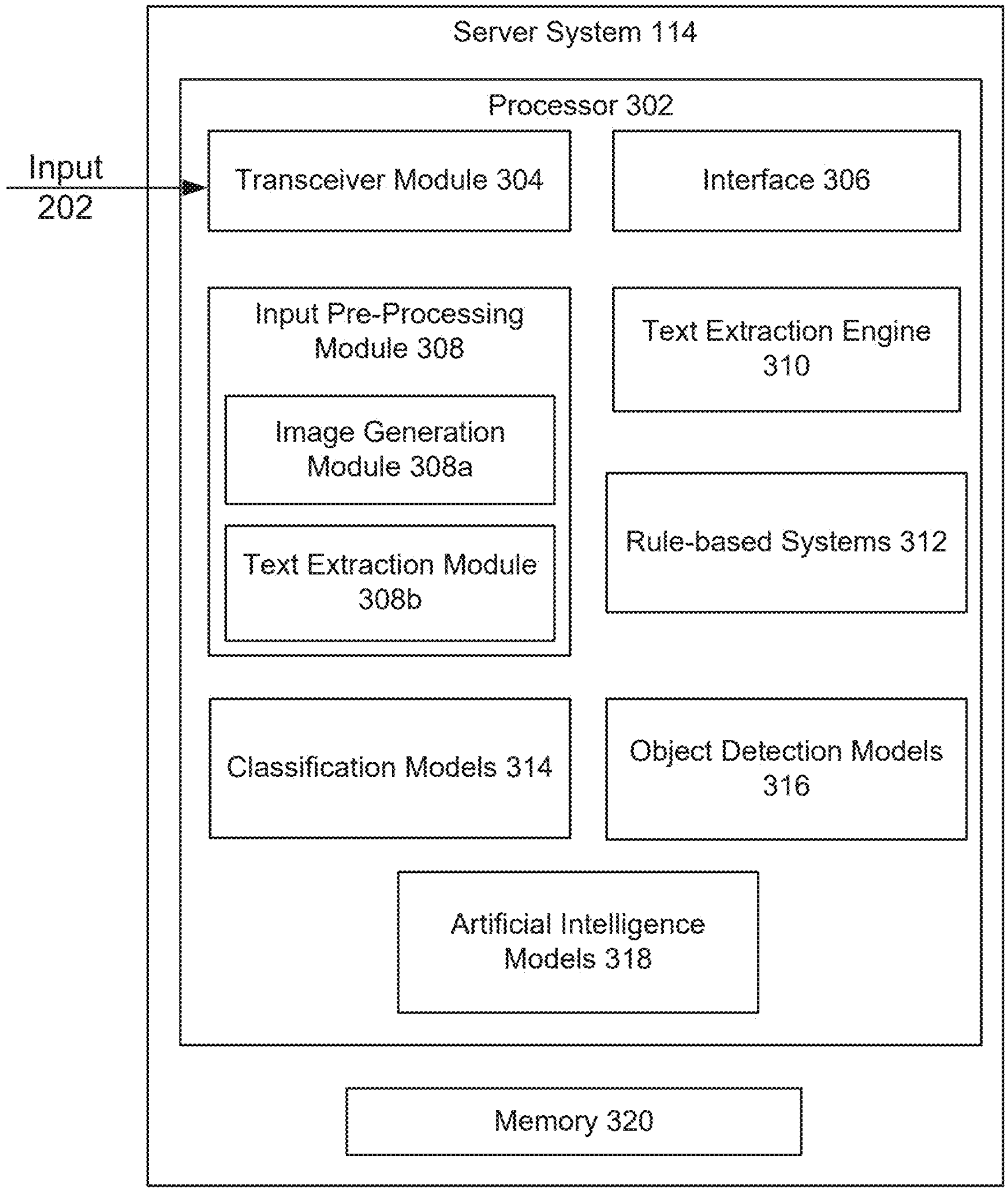
FIG. 4 illustrates a block diagram of an example computing server system, according to an exemplary aspect of the present disclosure.

Referring now to FIG. 4, at least one processor 302 of the server system 114 may be configured to control and execute a plurality of modules, engines, systems which may include a transceiver module 304, an interface 306, an input pre-processing module 308 comprising an image generation module 308*a* and a text extraction module for native PDFs module 308*b*, a text extraction engine 310 using OCR techniques, rule-based systems 312, classification models 314, object detection models 316, and AI models 318. The term "module," "engine," and "system" as used herein refers to a real-world device, component, or arrangement of components and circuitries implemented using hardware, such as by an application specific integrated circuit (ASIC) or field-programmable gate array (FPGA), for example, or as a combination of hardware and software, such as by a microprocessor system and a set of instructions to implement the module's, engine's, or system's functionality, which (while being executed) transform the microprocessor system into a special purpose device. A module, engine or system may also be implemented as a combination of the two, with certain functions facilitated by hardware alone, and other functions facilitated by a combination of hardware and software. Each module, engine, or system may be realized in a variety of suitable configurations, and should not be limited to any example implementation exemplified herein.

Memory 320, which is coupled to processor 302, may be configured to store at least a portion of information obtained by the server system 114. In one aspect, the memory 320 may be a non-transitory computer readable medium configured to store at least one set of data structures or instructions (e.g., software) embodying or utilized by at least one of the techniques or functions described herein. It should be appreciated that the term "non-transitory computer readable medium" may include a single medium or multiple media (e.g., one or more caches) configured to store at least one instruction. The term "computer readable medium" may include any medium that is capable of storing, encoding, or carrying instructions for execution by all modules, engines or systems of the server system 114 and that cause these modules, engines or systems to perform at least one of the techniques of the present disclosure, or that is capable of storing, encoding or carrying data structures used by or associated with such instructions. Non-limiting computer readable medium examples may include solid-state memories, and optical and magnetic media. Specific examples of computer readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

In various embodiments, the transceiver module 304 of the server system 114 may be controlled by processor 302 to exchange various information and data with other computing devices deployed within the communication network 112 and connected with the server system 114 (e.g., the computing device or system 104, 106, or 108 and/or the computing systems 116*a*, 116*b*, 116*c*, . . . 116*n* of FIG. 2).

The interface 306 may be controlled by processor 302 to provide necessary communication and interaction functions between various software components, hardware components, or users. For example, the interface 306 may provide a set of functions or protocols for other components to interact with a particular system or service, or be a physical device or circuitry that connects different electronic components or systems. For example, the user-facing application downloaded and installed on each hosting computing device or system 104, 106, or 108 of FIG. 2 may be a thin client device/terminal/application deployed within the computing system 100 and may be configured to perform certain preliminary processing of data relating to any received data from user 102*a*, 102*b* . . . 102*n*. Thereafter, the processed data may be transmitted to the server system 114 for further processing, if needed. In one embodiment, the interface 306 may include an API interface configured to make one or more API calls therethrough. For example, the computing systems 116*a*, 116*b*, 116*c*, . . . 116*n* of FIG. 2 may include one or more generative AI models and machine learning models, and the API interface of the server system 114 may exchange data with each model's API. On the other hand, the server system 114 may include an API gateway device (not shown) configured to receive and process API calls from various connected computing devices deployed within the system 100 (e.g., an operating system, a library, a device driver, an API, an application program, software or other module). Such an API gateway device may specify one or more functions, methods, classes, objects, protocols, data structures, formats and/or other features of the server system 114 that may be used by the mobile or web-based application. For example, the API interface included in the interface 306 may define at least one calling convention that specifies how a function associated with the server system 114 receives data and parameters from a requesting device/system and how the function returns a result to the requesting device/system. It should be appreciated that the server system 114 may include additional functions, methods, classes, data structures, and/or other features that are not specified through the API interface and are not available to a requesting computing device.

According to some aspects, the transceiver module 304 of the server system 114 may be controlled by the processor

302 to receive an input 202 (e.g., an ACORD 25 form in PDF for COI purposes) as shown in FIG. 3, via the transceiver module 304 and interface 306. It should be appreciated that, although an ACORD 25 form is described throughout the present disclosure as an example input to the computing system 100, input 202 may include any data relating to a COI review process which may be in the form of a document, an email, a text message, a voice message, an image or photo, tabular data, a checklist, a video, metadata, etc.

In one embodiment, the interface 306 may be configured to employ an API to initiate a plugin service provided by e.g., one of the computing systems 116*a*, 116*b*, 116*c*, . . . 116*n* of FIG. 2. Processing results may be displayed via a user interface associated with the application downloaded and installed on the selected computing device or system 104, 106, or 108 for interacting with each user 102*a*, 102*b* . . . 102*n*. For example, a user may enter the input 202 into a user interface element of the application (e.g., uploading an ACORD 25 form in PDF for COI purposes or directly taking a picture of an ACORD 25 form which may be converted into PDF by the application) and interact with outputs via a selection of user interface elements (e.g., choosing an output from a drop-down menu or a list of outputs, performing a click-and-drag operation, editing a selected AI/ML model output, etc.).

Referring now to FIGS. 3 and 4, to prepare the input 202 for multiple steps in the workflow 200, the input preprocessing module 308 may be configured to identify which parts are native PDF text and which are rasterized (scanned) images by identifying whether there is any embedded text layer in the input 202. A native PDF stores text as part of the document's content stream, using text operators like BT, ET, Tj, TJ, Tf, Td, etc. A native PDF also includes embedded fonts or references to system fonts, and text position and glyph rendering instructions (coordinates). These are vector instructions informing a PDF viewer how and where to draw characters. Native PDFs also contain a page object tree, which is parsed to reconstruct layout, text, images, and structure. The input pre-processing module 308 may detect native PDFs by identifying text-drawing operations, embedded font references, and text positioning instructions in the PDF content stream. These are structural features that only exist when the PDF includes real, embedded (i.e., selectable/searchable) text, typically found in native PDFs. For example, one or more libraries may be applied by the input pre-processing module 308 to detect native text by searching the PDF's content stream for text-related instructions (text operators, font embeddings, glyph positioning). If none is found, the page is determined to be a scanned image, not a native PDF. Specifically, Tj, TJ, BT, ET operators may be searched because they are PDF's low-level text rendering commands, and native text always uses them. Font objects (/Font,/F1, etc.) may be searched because they define how glyphs should be rendered. Native PDFs embed or reference fonts. Additionally, text coordinates and positioning (Td, Tm) may be located because they signify where on the page to place each character or word. Glyph-to-Unicode mapping (e.g., ToUnicode CMaps) maps rendered characters to real text for extraction or search and may be another indicator of a native PDF.

In accordance with aspects of the present disclosure, the image generation module 308*a* of the input pre-processing module 308 may generate a plurality of images of the COI PDFs 208, 210, and 212 in connection with the input 202. In one implementation, the image generation module 308*a* may use a library to convert pages in the ACORD 25 form in PDF into rasterized image(s) (e.g., PNG, JPEG, etc.). As a result, each page of the ACORD 25 form in PDF may be converted into a bitmap, pixel by pixel. Specifically, the image generation module 308*a* may perform PDF parsing by identifying each PDF's page structure, fonts, vector graphics, embedded images, etc. Next, a page rendering process may be carried out to convert the PDF's vector-based content into a raster image. For example, text (vector-based) is rasterized into pixels. Images may stay as-is unless resized. Lines, checkboxes, form fields, etc., may be all drawn into the bitmap as pixels. This page rendering process may be a visual rendering, not text extraction or interpretation. Rasterization may be subsequently performed, such that the vector page content is sampled into pixels based on a selected DPI. As shown in FIG. 3, the outputs of the image generation 204 may include a first COI image with 200 DPI 208, a second COI image with 400 DPI 210, and a third COI image with 500 DPI 212. Higher DPI means a sharper image and more sizable file. Once rasterized, each page may be saved in a chosen image format (e.g., PNG or JPEG). All of the resulting images 208, 210, and 212 may be input to the text extraction engine 310 for interpretation using e.g., OCR 214.

In some embodiments, the image generation module 308*a* may not read or extract text, does not perform OCR, does not understand forms or field content, and does not parse layout or structure of the input 202. Serving as a visual layer renderer, the image generation module 308*a* transforms each page of the input 202 into a high-resolution image, in accordance with selected DPIs. For example, the generated images 208, 210, and 212 have different DPIs-200, 400, and 500 DPIs, respectively. These images may be de-skewed to correct the tilt or rotation of each image. For example, the image generation module 308*a* may analyze each image to estimate the angle at which it is rotated (skewed) and apply a rotation transform to straighten each image so that horizontal and vertical lines are properly aligned.

De-skewing may initially involve edge detection and contrast thresholding. For example, contrast-based edge detection may be performed to locate lines and borders in each generated image 208, 210, and 212. A de-skew threshold is a value (often a percentage) that defines how the image generation module 308*a* controls the maximum angle of skew that will be corrected. The de-skew threshold balances the need to correct skew with the potential for over-correction or false positives. A lower threshold means the algorithm is less likely to apply a correction, while a higher threshold allows for larger skew angles to be straightened. Next, the image generation module 308*a* may perform a skew angle estimation to determine dominant linear features such as lines of text. Radon transform or Hough line transform may be used to detect angles, and an average skew angle may be calculated. The image generation module 308*a* may rotate each generated image 208, 210, and 212 by the inverse of that estimated skew angle (i.e., rotates it back to level), using bilinear or bicubic interpolation to avoid image quality loss. The image generation module 308*a* may also auto-crop or fill background as needed.

In accordance with further aspects, in response to detecting native PDFs in the input 202, the text extraction module 308*b* of the input pre-processing module 308 may be configured to apply a plurality of libraries to extract text therefrom. In one embodiment, the text extraction module 308*b* may use a first library to extract text by parsing the PDF content stream, detecting text drawing operations, and reconstructing text by interpreting font glyphs, character codes, and positioning. For example, the carousel object structure (COS) model of the PDF may be identified such that every page, font, image, and stream is a node in this internal object tree. Pages of the native PDF may be parsed. Each page contains a sequence of drawing instructions including: BT/ET (Begin/End Text); Tf (set font); Td/Tm (set position/matrix); and Tj/TJ (text drawing commands). The text extraction module 308*b* may use the content stream per page to reconstruct the glyph layout which is mapped to Unicode text. Text in PDFs is often stored as character codes, not actual text. ToUnicode CMaps, which is the result of the glyph layout to Unicode text mapping, may be used to map character codes to real text for extraction or search. Alternatively, heuristics or font program information may be used. Fonts may be embedded or external and the text extraction module 308*b* may decode these accordingly. To handle text positioning and layout, the text extraction module 308*b* may keep track of text coordinates using transformation matrices to reconstruct lines and paragraphs based on horizontal and vertical spacing, font sizes and baselines, and word breaks. As noted above, PDFs store no real words, just glyphs. Once all glyphs are decoded and positioned, the text extraction module 308*b* may group text into lines or paragraphs and output a reconstructed text string. That is, the text extraction module 308*b* decodes streams of vector glyph commands in native PDF of the input 202 into meaningful Unicode text. Referring to FIG. 3, text extraction for native PDFs 206 is different from the text extraction using OCR 214 for scanned PDFs.

In certain situations, if no output is produced as a result of applying the first library, the text extraction module 308*b* may apply multiple libraries (e.g., concurrently or sequentially) to process the input 202 to generate the first version of the text (hereinafter referred to as "text1"). For example, the text extraction module 308*b* may apply a second library to extract both the text and layout and structural information from native PDF included in the input 202. In one implementation, the text extraction module 308*b* may identify PDF content stream by parsing each page which contains a sequence of drawing instructions including: BT/ET (Begin/End Text); Tf (set font); Td/Tm (set position/matrix); and Tj/TJ (text drawing commands). The text extraction module 308*b* may use the content stream per page to decode fonts and glyphs to Unicode using e.g., ToUnicode CMaps. Text may not only be represented as lines or paragraphs, but also as a list of characters, each having text value (decoded glyph), font information, X/Y position, width, height, font size, and character orientation. These characters may be grouped by spatial proximity, font and size similarity, and baseline alignment. For example, if two characters are horizontally adjacent with consistent spacing, it forms a word.

To handle layout and geometry, the text extraction module 308*b* may use the second library to expose bounding boxes for words and characters, rulings (straight lines used in tables or forms), rectangles, curves, and image objects, and tables, based on lines and word alignment. That is, the text extraction module 308*b* may obtain geometry related information where text position matters, such as parsing structured forms, extracting tables, locating data fields in the input 202.

According to some embodiments, the second library may be followed by applying a third library if the second library fails to produce the first version of the text extraction for native PDFs from the input 202. In one implementation, the text extraction module 308*b* may use a fast (C++ backend, Python wrapper), lightweight, reliable and less granular library to parse a PDF page tree and content streams of the input 202 and interpret instructions such as BT/ET (Begin/End Text); Tf (set font); Tm, Td, T* (text positioning); and Tj, TJ (glyph rendering). ToUnicode CMaps, if provided, may be used to map character codes to Unicode. Embedded font programs (Type1, TrueType, etc.) may be used. Instead of recreating exact layout, the text extraction module 308*b* may use the third library to reconstruct lines using visual positioning. For example, horizontal position deltas may correspond to word breaks, vertical offsets corresponding to new lines, and font sizes corresponding to optional formatting awareness. However, this approach provides no access to bounding boxes, font names or sizes, table or grid detection or line rulings of form field recognition. The text extraction module 308*b* may stream out plain Unicode text, line by line, as the output.

According to one aspect, another version of the extracted text may be generated using just the third library and will be used only for extracting the Description of Operations/Locations/Vehicles and Certificate Holder entities 216, as shown in FIG. 3. This text will be referred to as "text2" in the rest of this disclosure. Both text1 and text2 may be converted to lowercase for the subsequent steps.

For entities relating to Limits, Policy Dates, and Description in the input 202, text extraction using OCR 214 in the workflow 200 of FIG. 3 may be carried out by the text extraction engine 310 of the server system 114 by obtaining the text from the gray-scaled images of the PDFs (both native and scanned) using OCR for each of the images 208, 210, and 212. These texts will be referred to as "text200," "text400," and "text500," corresponding to DPIs 200, 400, and 500 of the images 208, 210, and 212, respectively. According to some implementations, one of three images 208, 210, and 212 may be more effective than the others in identifying an entity, which is not always the same across the entire dataset of the computing system 100. DPI controls the resolution of raster images generated from PDFs. Higher DPI of an image means more pixels per inch, so smaller details such as diacritics, punctuation, or tiny font features may be better preserved. Higher DPI of an image may generally improve the accuracy of OCR results due to character clarity, better binarization, improved text segmentation, and enhanced language model performance. That is, if fine lines and curves are sharper in a high DPI image, it helps OCR segment characters more accurately. Thresholding (converting to black and white) works better when letterforms are clearer. In some embodiments, the text extraction engine 310 may rely on precise bounding boxes, and high DPI of an image may make it easier to detect where characters and lines start and end. Further, if the visual layer is clearer, fewer visual misreads may lead to better final predictions from the OCR's NLP layer.

However, high DPI in an image may not always guarantee more accurate OCR results due to a number of factors including but not limited to noise amplification, aliasing in low-resolution sources, OCR latency, memory footprint, overfitting to glyph edges, etc. Specifically, higher DPI in an image can exaggerate paper texture, dirt, or scanner artifacts, namely, noise amplification. If the original scan was low-resolution, up-sampling may create fake sharpness that confuses OCR. More pixels in high DPI images require heavier computation, especially on multi-page documents. Larger images also require more RAM, I/O, and GPU/CPU usage. Moreover, some OCR engines may perform worse on overly crisp or jagged outlines.

All of the text200, text400, and text500 may be converted by the text extraction engine 310 to lowercase for subsequent steps of the workflow 200 of FIG. 3. Bounding box coordinates corresponding to the words may also be extracted using the text extraction engine 310 for these documents, which may be used for proximity checks in the rule-based system(s) 312 described in the subsequent steps. A bounding box is a rectangle described by a top-left corner (x0, y0) and a bottom-right corner (x1, y1) or sometimes (x, y, width, height). In some embodiments, in addition to word-level boxes, the text extraction engine 310 may also determine line or paragraph-level groupings for detected texts and even character-level boxes, if configured. These coordinates are crucial for document layout understanding, highlighting text, or form parsing. For example, the text extraction engine 310 may binarize or normalize the text200, text400, and text500 and segment text regions using one or more techniques such as connected components, contour detection, projection profiles. Next, glyphs may be grouped into words based on techniques such as inter-character spacing, baseline alignment, and language model prediction. The text extraction engine 310 may fit bounding boxes around the detected word or line. The text extraction engine 310 may be configured to generate structured outputs in various useable formats such as HTML-style spatial text (HOCR), XML format used in libraries/archives (ALTO XML), and plain text.

According to further aspects, the rule-based systems 312 of the server system 114 may be configured to extract entities based at least upon identifying a label in the texts (using regular expressions) that is in close proximity to the value to be extracted. As shown in FIG. 3, the rule-based systems 312 may use label-value technique(s) 218 in processing both native PDFs received from 206 and scanned or OCRed PDFs from 214 of the workflow 200. Proximity rules using both textual (only for native PDFs) and spatial distances may then be used to identify the values. Native PDFs have an embedded text layer, where words are selectable. The rule-based systems 312 may use textual proximity to process the content as a string of words or lines, like plain text, using label-index-based logic such as "Find 'Date:' in the next stream, and the next word is value." On the other hand, for scanned PDFs or OCRed images, the rule-based systems 312 may receive the outputs from the text extraction engine 310 with a set of bounding boxes for words, but no reliable information regarding text order. For example, XY coordinates or positions of each bounding box may be used to carry out the spatial proximity using "Final all text within 50px to the right and on the same line as 'Date'." The rule-based systems 312 may use a hybrid approach in processing both native and scanned PDFs by applying textual rules if an input has a valid embedded text layer and then employing spatial rules if OCR results are available. Alternatively, the rule-based systems 312 may first match labels using text-based search and then confirm values using spatial closeness (e.g., <100 pixels to the right or below).

Figure 5:
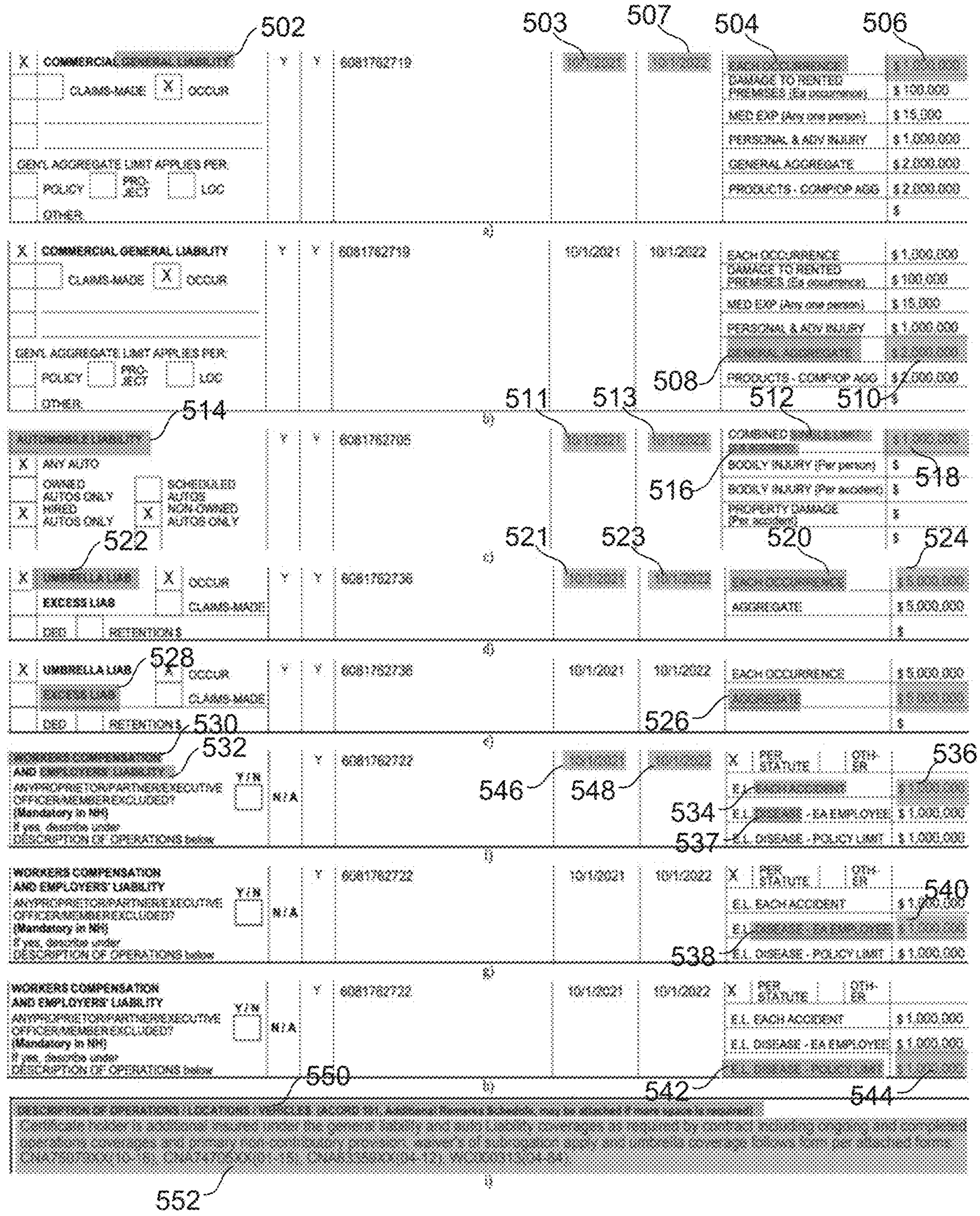
FIG. 5 illustrates cropped sections of an example COI document with a number of labels and values to be extracted by a computing system, according to an exemplary aspect of the present disclosure.

According to certain implementations, FIG. 5 shows a number of selected labels corresponding to 17 entities in an example input 202. The rules used by the computing system 100 may be combined using a hierarchy that gave the highest accuracy for the entities on a test dataset of the computing system 100. Since OCR results may be prone to some degree of error, rules based on textual distance may be used first. If no results have been obtained, rules based on spatial distance may be used for each of the DPIs (in different orders for different entities). In order to provide better OCR results, the rule-based systems 312 may initially crop out the targeted section of an image. Instead of running OCR on the entire document image, the rule-based systems 312 may isolate a smaller region, for example, just the section around the "Total Amount" field or "Date." This can reduce noise, improve OCR accuracy, and make text extraction faster and more reliable.

In some cases, while using the OCR results, smaller sections may be cropped out from the image, and the text from these sections may then be extracted using another round of OCR to get better quality results. In other words, the rule-based systems 312 may carry out additional OCR of an input. After initial OCR, the rule-based systems 312 may locate a potential label or field, crop out the surrounding bounding box (e.g., a 200×50 pixel region around a label), and re-run OCR to process the cropped portion to get higher accuracy, especially when original scan is noisy or blurry, font is small, or there is handwriting or faded text.

Regular expressions for numerical values and date formats may be used to identify the limits and dates, respectively. In one example, the rule-based systems 312 may use regex rules to identify structured content: Dates: \d{4}-\d{2}-\d{2} or \d{2}/\d{2}/\d{4}; Amounts: \$?\d{1,3}(,\d{3})*(\.\d{2})? For all pairs of dates identified in the text in the subsequent steps, the first and second occurrences of these dates may correspond to the Effective and Expiry Dates, respectively.

Each Occurrence Limit for Commercial General Liability

Referring to FIG. 5, the terms "general liability" 502 and "each occurrence" 504 may be used as labels (hereinafter referred to as GL and EO). The following steps may be used by the rule-based systems 312 to extract both entities. As the first step, the rule-based systems 312 may identify the first occurrence of EO in text1. If present, the rule-based systems 312 may identify the numerical value within close textual proximity to it (e.g., 506 in FIG. 5). If no value is found, the rule-based systems 312 may proceed to the second step to locate the first occurrence of EO in text400 and determine its coordinates in the corresponding image. If present, the rule-based systems 312 may crop out a horizontal strip from the image containing EO and of height similar to EO. The rule-based systems 312 may further extract the text from the strip using a selected OCR model and determine the numerical value within close spatial proximity to EO. If EO is not present, the rule-based systems 312 may proceed to the third step during which the rule-based systems 312 may repeat the second step with GL instead of EO. If no value is found, the rule-based systems 312 may proceed to the fourth step during which the rule-based systems 312 may repeat the second and third steps with text200 and text500, respectively, instead of text400.

General Aggregate Limit for Commercial General Liability

Referring to FIG. 5, the term "general aggregate" 508 may be used as a label (hereinafter referred to as GG). The following steps may be carried out by the rule-based systems 312 to extract this entity. During the first step, the rule-based systems 312 may locate GG in text1. If present, the rule-based systems 312 may determine the numerical value within close textual proximity to it (e.g., 510 of FIG. 5). If no value is found, the rule-based systems 312 may proceed to the next step. During the second step, the rule-based systems 312 may locate GG in text400 and determine its coordinates in the corresponding image. If present, the numerical value may be further determined within close spatial proximity to it. If no value is found, the rule-based systems 312 may proceed to the third step, during which the rule-based systems 312 may repeat the second step with text200 and text500, respectively.

Policy Effective and Expiry Dates for Commercial General Liability

The terms "each occurrence" 504 and "general liability" 502, as shown in FIG. 5, may be used as labels (hereinafter referred to as EO and GL, respectively). The following steps may be carried out by the rule-based systems 312 to extract the entities. During the first step, the rule-based systems 312 may locate EO before the word "product" in text1. If present, the rule-based systems 312 may identify the dates within close textual proximity to it. If no dates are found, the rule-based systems 312 may proceed to the second step during which EO may be identified in text400 and its coordinates may be determined in the corresponding image. If present, the rule-based systems 312 may crop out a horizontal strip from the image containing EO and of height approximately the same as the General Liability portion. The rule-based systems 312 may extract the text from the strip using a selected OCR model and identify the dates within close spatial proximity to EO (e.g., 503 and 507 in FIG. 5). If EO is not present, the rule-based systems 312 may proceed to the third step. For example, the rule-based systems 312 may repeat the second step with GL instead of EO. If no dates are found, the rule-based systems 312 may proceed to the next step. During the fourth step, if EO is present in text400, the rule-based systems 312 may find the dates within close spatial proximity to EO. If no dates are found, the rule-based systems 312 may proceed to the fifth step, during which the rule-based systems 312 may repeat the fourth step with GL instead of EO. If no dates are found, the rule-based systems 312 may proceed to the last step, during which the rule-based systems 312 may repeat steps 2, 3, 4 and 5 with text200 and text500, respectively.

Combined Single Limit for Automobile Liability

Referring to FIG. 5, the terms "single limit" 512, "automobile liability" 514, and "ea accident" 516 may be used as labels (hereinafter referred to as SL, AL, and EA, respectively). The following steps may be carried out by the rule-based systems 312 to extract the entity. For example, the rule-based systems 312 may locate SL in text1. If present, the rule-based systems 312 may determine the numerical value within close textual proximity to it (e.g., 518 in FIG. 5). If no value is found, the rule-based systems 312 may proceed the second step, during which AL may be searched in text400 and its coordinates may be obtained in the corresponding image. If present, the rule-based systems 312 may crop out a horizontal strip from the image containing AL and of height similar to AL. The rule-based systems 312 may extract the text from the strip using a selected OCR model and find the numerical value within close spatial proximity to AL. If AL is not present, the rule-based systems 312 moves to the next step. The rule-based systems 312 may repeat step 2 with SL and EA instead of AL but crop out a strip twice their height. If no value is found, the rule-based systems 312 may proceed to the next step. During the fourth step, if AL is present in text400, the rule-based systems 312 determine the numerical value within close spatial proximity to it. If not present, the rule-based systems 312 moves to the next step, during which step 4 may be repeated with SL and EA instead of AL. If no value is found, the rule-based systems 312 may proceed to the last step, during which steps 2, 3, 4 and 5 may be repeated with text200 and text500, respectively.

Policy Effective and Expiry Dates for Automobile Liability

The terms "single limit" 512, "automobile liability" 514, and "ea accident" 516 may continue to be used as labels (hereinafter referred to as SL, AL, and EA, respectively). The following steps may be carried out by the rule-based systems 312 to extract the entity. For example, during the first step, the rule-based systems 312 may locate SL before the word "umbrella" in text1. If present, the rule-based systems 312 may locate the dates within close textual proximity to it. If no dates are found, the rule-based systems 312 moves to the next step. During the second step, the rule-based systems 312 may locate AL in text200 and get its coordinates in the corresponding image. If present, the rule-based systems 312 may crop out a horizontal strip from the image containing AL and of height approximately the same as the Automobile Liability portion. The rule-based systems 312 may then extract the text from the strip using a selected OCR model and find the dates within close spatial proximity to AL (e.g., 511 and 513 in FIG. 5). If AL is not present, the rule-based systems 312 may proceed to the third step, during which the rule-based systems 312 repeat the second step with SL and EA instead of AL. If no dates are found, the rule-based systems 312 may proceed to the fourth step. If AL is present in text200, the rule-based systems 312 identify the dates within close spatial proximity to it. If no dates are found, the rule-based systems 312 may proceed to the next step by repeating step 4 with SL and EA instead of AL. If no dates are found, the rule-based systems 312 may proceed to the last step by repeating steps 2, 3, 4 and 5 with text400 and text500, respectively.

Each Occurrence Limit for Umbrella and Excess Liability

The terms "each occurrence" 520 and "umbrella liab" 522, as shown in FIG. 5, may be used as labels (hereinafter referred to as EO and UL, respectively). The following steps may be carried out by the rule-based systems 312 to extract the entity. For example, during the first step, the rule-based systems 312 may identify the second occurrence of EO in text1 (i.e., 520, not 504, in FIG. 5). If present, the rule-based systems 312 determine the numerical value within close textual proximity to it. If no value is found, the rule-based systems 312 may proceed to the second step by locating EO in text400 in the bottom half of the image (i.e., distinguishing over EO 504 associated with Commercial General Liability usually located on the top half of the image) and obtaining its coordinates in the corresponding image. If present, the rule-based systems 312 determine the numerical value within close spatial proximity to EO (e.g., 524 in FIG. 5). If no value is found, the rule-based systems 312 may proceed to the third step by repeating the second step with UL instead of EO. If no value is found, the rule-based systems 312 may proceed to the last step by repeating steps 2 and 3 with text200 and text500, respectively.

Aggregate Limit for Umbrella and Excess Liability

Referring to FIG. 5, the terms "aggregate" 526, not closely preceded by the characters "gen," and "excess liab" 528 may be used as labels (hereinafter referred to as AG and EL, respectively. The following steps may be carried out by the rule-based systems 312 to extract the entities. For example, during the first step, the rule-based systems 312 may locate the occurrence of AG before the word "disease" in text1. If present, the rule-based systems 312 may determine the numerical value within close textual proximity to it. If no value is found, the rule-based systems 312 may proceed to the second step by locating EL in text200 and obtaining its coordinates in the corresponding image. If present, the rule-based systems 312 may crop out a horizontal strip from the image containing EL and of height similar to EL. The rule-based systems 312 may extract the text from the strip using a selected OCR model and find the numerical value within close spatial proximity to EL. If EL is not present, the rule-based systems 312 may proceed to the third step, during which the rule-based systems 312 may repeat the second step with AG instead of EL. If no value is found, the rule-based systems 312 may move to the last step by repeating steps 2 and 3 with text400 and text500, respectively.

Policy Effective and Expiry Dates for Umbrella and Excess Liability

Referring still to FIG. 5, the terms "each occurrence" 520 and "umbrella liab" 522 may continue to be used as labels (hereinafter referred to as EO and UL, respectively). The following steps may be carried out by the rule-based systems 312 to extract the entities. For example, during the first step, the rule-based systems 312 may locate EO before the word "compensation" and after the word "umbrella" in text1. If present, the rule-based systems 312 may find the dates within close textual proximity to it. If no dates are found, the rule-based systems 312 may proceed to the second step by locating EO in text400 in the bottom half of the image and obtaining its coordinates in the corresponding image. If present, the rule-based systems 312 may crop out a horizontal strip from the image containing EO and of height approximately the same as the Umbrella and Excess Liability portion. The rule-based systems 312 may then extract the text from the strip using a selected OCR model and determine the dates within close spatial proximity to EO (e.g., 521 and 523 in FIG. 5). If EO is not present, the rule-based systems 312 move to the next step. During the third step, the rule-based systems 312 may repeat step 2 with UL instead of EO. If no dates are found, the rule-based systems 312 move to the next step. During the fourth step, if EO is present in text400 in the bottom half of the image, the rule-based systems 312 may identify the dates within close spatial proximity to EO. If no dates are found, the rule-based systems 312 may proceed to the next step by repeating step 4 with UL instead of EO. If no dates are found, the rule-based systems 312 may proceed to the last step by repeating steps 2, 3, 4 and 5 with text200 and text500, respectively.

E.L. Each Accident Limit

The terms "employers' liability" 532, "workers compensation" 530, and "each accident" 534, as shown in FIG. 5, may be used as labels (hereinafter referred to as EL, WC, and EA, respectively). The following steps may be carried out by the rule-based systems 312 to extract this entity. For example, during the first step, the rule-based systems 312 may locate EL before the word "disease" in text1 (e.g., 537 in FIG. 5). If present, the rule-based systems 312 determine the numerical value within close textual proximity to it. If no value is found, the rule-based systems 312 may proceed to the next step. During the second step, the rule-based systems 312 repeat the first step with WC instead of EL. If no value is found, the rule-based systems 312 proceed to the next step. During the third step, the rule-based systems 312 may locate EL in text200 and get its coordinates in the corresponding image. If present, the rule-based systems 312 determine the numerical value within close spatial proximity to it (e.g., 536 in FIG. 5). If no value is found, the rule-based systems 312 proceed to the next step. During the fourth step, the rule-based systems 312 repeat step 3 with WC and EA instead of EL. If no value is found, the rule-based systems 312 may proceed to the last step by repeating steps 3 and 4 with text400 and text500, respectively.

E.L. Disease-EA Employee Limit

The term "disease" 538 in FIG. 5 followed closely by the term "ea emp" may be used as a label (hereinafter referred to as D-EE). The following steps may be carried out by the rule-based systems 312 to extract this entity. During the first step, for example, the rule-based systems 312 locate D-EE in text1. If present, the rule-based systems 312 determine the numerical value within close textual proximity to it. If no value is found, the rule-based systems 312 proceed to the second step, during which the rule-based systems 312 may locate D-EE in text200 and get its coordinates in the corresponding image. If present, the rule-based systems 312 determine the numerical value within close spatial proximity to it (e.g., 540 in FIG. 5). If no value is found, the rule-based systems 312 proceed to the last step by repeating the second step with text400 and text500, respectively.

E.L. Disease-Policy Limit

The term "disease" 542 in FIG. 5 followed closely by the term "pol" or "lim" may be used as a label (hereinafter referred to as D-P/L). The following steps may be carried out by the rule-based systems 312 to extract this entity. During the first step, for example, the rule-based systems 312 may locate D-P/L in text1. If present, the rule-based systems 312 determine the numerical value within close textual proximity to it. If no value is found, the rule-based systems 312 proceed to the second step, during which the rule-based systems 312 may locate D-P/L in text200 and get its coordinates in the corresponding image. If present, the rule-based systems 312 crop out a horizontal strip from the image containing D-P/L and of height similar to D-P/L, and then extract the text from the strip using a selected OCR model and determine the numerical value within close spatial proximity to D-P/L (e.g., 544 in FIG. 5). If no value is found, the rule-based systems 312 may proceed to the next step. During the third step, the rule-based systems 312 may locate D-P/L in text200 and get its coordinates in the corresponding image. If present, the rule-based systems 312 find the numerical value within close spatial proximity to it. If no value is found, the rule-based systems 312 proceed to the last step by repeating steps 2 and 3 with text400 and text500, respectively.

Policy Effective and Expiry Dates for Workers Compensation and Employers' Liability The terms "workers compensation" 530, "employers' liability" 532, "disease" 537, and "each accident" 534, as shown in FIG. 5, may continue to be used as the labels (hereinafter referred to as WC, EL, D, EA, respectively). The following steps may be carried out by the rule-based systems 312 to extract these entities. For example, during the first step, the rule-based systems 312 may locate WC before D in text1. If present, the rule-based systems 312 identify the dates within close textual proximity to it. If WC is not present, the rule-based systems 312 proceed to the next step. During the second step, the rule-based systems 312 repeat the first step with EL instead of WC. If dates are not found, the rule-based systems 312 proceed to the next step, during which the rule-based systems 312 locate WC in text400 and determine its coordinates in the corresponding image. If present, the rule-based systems 312 crop out a horizontal strip from the image containing WC and of height approximately the same as the Workers Compensation and Employers' Liability portion. The rule-based systems 312 may then extract the text from the strip using a selected OCR model and identify the dates within close spatial proximity to WC (e.g., 546 and 548 in FIG. 5). If WC is not present, the rule-based systems 312 proceed to the next step. During the fourth step, the rule-based systems 312 repeat the prior step 3 with EL, D, and EA instead of WC. If no dates are found, the rule-based systems 312 proceed to the fifth step during which, if WC is present in text400, the rule-based systems 312 identify the dates within close spatial proximity to WC. If no dates are found, the rule-based systems 312 may proceed to the next step. The rule-based systems 312 repeat step 5 with EL, D, and EA instead of WC. If no dates are, during the last step, the rule-based systems 312 repeat steps 3, 4, 5 and 6 with text200 and text500, respectively.

Description of Operations/Locations/Vehicles

The term "description" 550 in FIG. 5 followed closely by the term "location," "vehicle," "acord 101" may be used as a label (hereinafter referred to as L1). The terms "certificate holder" in 552 and "cancellation" may be used to identify the end of the description section (hereinafter referred to as E1 and E2, respectively). The following steps may be carried out by the rule-based systems 312 to extract this entity. For example, during the first step, the rule-based systems 312 may locate L1, E1, and E2 in text2. If L1 and at least one of E1 and E2 are present, the rule-based systems 312 identify the text starting with the line after L1 until the line before E1 or E2, whichever is present. If no text is found, the rule-based systems 312 proceed to the next step. During the second step, the rule-based systems 312 locate L1, E1, and E2 in text400 and determine its coordinates in the corresponding image. If L1 and at least one of E1 and E2 are present, the rule-based systems 312 crop out the section from the image between L1 and E1 or E2, whichever is present. Then, the rule-based systems 312 extract the text from the section using a selected OCR model. If no text is found, the rule-based systems 312 move to the next step. During the third step, the rule-based systems 312 may locate each L1, E1, and E2 in text400 and determine each respective coordinates in the corresponding image. If L1 and at least one of E1 and E2 are present, the rule-based systems 312 may identify the text between L1 and E1 or E2, whichever is present. If no text is found, the rule-based systems 312 proceed to the next step. During the last step, the rule-based systems 312 may repeat steps 2 and 3 with text200 and text500, respectively.

In one aspect, as shown in FIG. 3, the entities related to Limits, Policy Dates, and Description in the input 202 (e.g., 17 entities) may be identified and extracted by the server system 114 and saved in database 220 which is associated (e.g., memory 320 of FIG. 4) or accessible by the server system 114.

For 8 entities relating to Additional Insured, Subrogation Waived, and Per Statute in the input 202, in accordance with aspects of the present disclosure, at least one pre-trained classification model of the server system 114 may be fine-tuned for the task of binary image classification on a custom dataset for each of the 8 entities. In an embodiment, as shown in FIG. 3, the image of a COI document (e.g., 200 DPI image 208) may be used as the input to the classification models 314 of the server system 114 for predicting whether the entity is selected or not. Each classification model may be configured to process the image of the document and predict true/false for the corresponding entity. Classification model training parameters may be determined based on each specific training dataset and corresponding dataset infrastructure. In one embodiment, each classification model of the present disclosure may use a train set including 25k inputs, a test set including 5k inputs, test F1 score 0.99, Epochs 7-11 (different for different models), activation function: Sigmoid, optimizer: Adam, learning rate: 1e-5, batch size: 2 per GPU (8 GPUs used), image size: resized to 224×224, and loss function: binary cross-entropy.

According to one implementation, the classification models 314 may employ a unified multimodal framework that simultaneously processes textual (what is written), layout (where the text appears spatially), and visual information (what the document looks like, e.g., fonts, tables, boxes) contained in the input document image 208. Building upon a single-stream architecture, the classification models 314 may be configured to integrate different modalities without requiring separate encoders and use a self-supervised pre-training approach that incorporates three key objectives: masked language modeling to predict masked tokens using visual and text context, masked image modeling, and word-patch alignment to ensure correspondence between visual and text modalities. As a result, the classification models 314 may develop robust representations that capture the intricate relationships between textual content and visual elements within input documents. In some embodiments, the classification models 314 may use a Vision Transformer (ViT) to learn from raw pixel inputs and combine this with token embeddings (for text) and 2D positional embeddings (for layout), thereby treating document images as sequences of patches while preserving spatial information through 2D positional embeddings.

In some aspects, the classification models 314 may be fine-tuned only using visual inputs (images) and a library configured to provide pre-trained models for NLP, computer vision, and multimodal tasks. The library may wrap complex model architectures (BERT, GPT, ViT, LayoutLM, etc.) into user-friendly APIs, handle tokenization, data preprocessing, and model loading, and support training, fine-tuning, and evaluation.

In one embodiment, the classification models 314 may only use raw images of an input document (e.g., 200 DPI image 208) and employ 8 computer vision machine learning binary classification models trained for the task of identifying whether each of 8 entities are selected or present or not in the images of the PDFs. Text and bounding box inputs of the input document may not be used.

In one aspect, as shown in FIG. 3, the entities related to Additional Insured, Subrogation Waived, and Per Statute in the input 202 (e.g., 8 entities) may be identified and extracted by the server system 114 and saved in database 220 which is associated (e.g., memory 320 of FIG. 4) or accessible by the server system 114.

Figure 6:
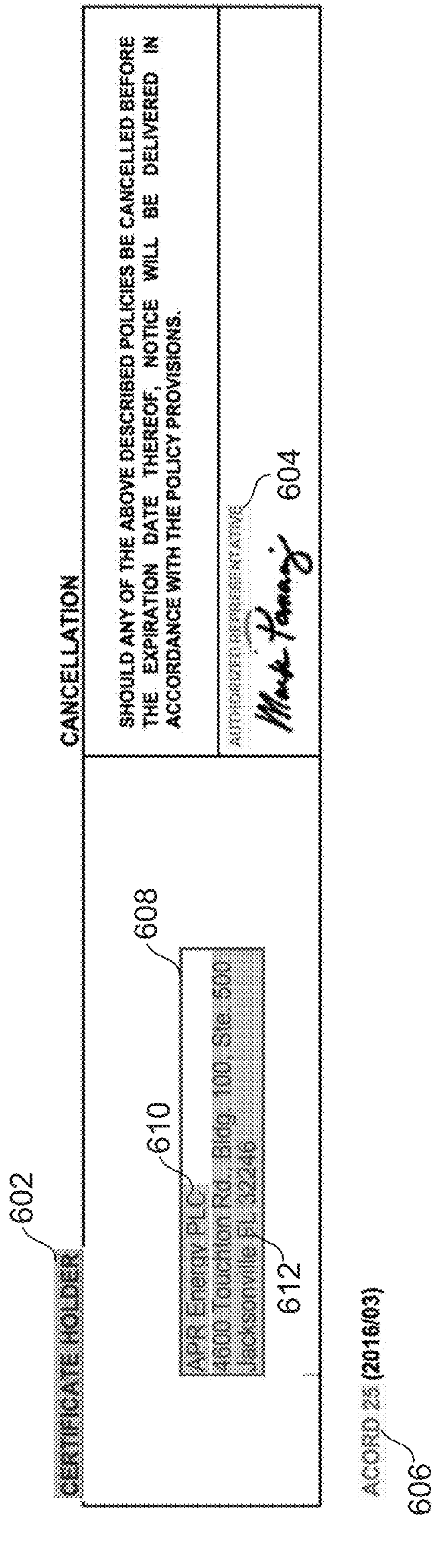
FIG. 6 illustrates cropped sections of an example COI document with a number of labels, values, a bounding box, and terms to be extracted by a computing system, according to an exemplary aspect of the present disclosure.

In accordance with further aspects of the present disclosure, as shown in FIG. 3, the certificate holder information in the input 202 may be extracted 216 using a combination of a rule-based system using the label-value technique, similar to those described above, an object detection model 224 trained for the task of identifying the area containing the certificate holder information in the image of the PDF (e.g., 200 DPI image 208), and a generative AI model 226 to extract the information from the identified area. Referring to FIG. 4, in one embodiment, the object detection models 316 of the server system 114 may be developed by fine-tuning a pre-trained multimodal transformer model on a custom dataset using a library configured to include at least training scripts for the pre-trained multimodal transformer model. The object detection models 316 may receive the image of a COI document (e.g., 200 DPI image 208) as the input and return the bounding box coordinates of the certificate holder area, as shown in FIG. 6. According to certain implementations, Anthropic's Claude 3.5 Sonnet v2 may be selected by the server system 114 to extract the information from the identified area. The first line of the extracted text may correspond to the name and the rest to the address of the certificate holder. Some exceptions to this may be handled using address cues like P.O. Box number, suite number, etc. In certain embodiments, the AI models 318 of the server system 114 may make one or more API calls to at least one of a plurality of computing systems 116*a*, 116*b*, 116*c*, . . . 116*n* of FIG. 2 to invoke a foundation model (e.g., Anthropic, Meta, Cohere, Amazon Titan) and get the outputs of the foundation model as the predicted results. For example, the AI models 318 may extract the region of interest, send that cropped image via an API call using a prompt like "Extract the name of the certificate holder from the input." The foundation model may rely "John Doe Insurance Co." and the AI models 318 may use this output as the prediction. In alternative embodiment, the AI models 318 may be configured to train and host a model locally and run the model locally to generate predictions.

In an embodiment, referring to FIG. 6, the term "certificate holder" 602 may be used as a label for a rule-based system (hereinafter referred to as CH). The terms "authorized representative" 604 and "acord 25" 606 may be used to identify the end of the certificate holder section (hereinafter referred to as E1 and E2, respectively). FIG. 6 shows certain example labels and end-terms. The following steps may be carried out by the server system 114 to extract these entities. During the first step, the rule-based systems 312 may locate CH, E1, and E2 in text2. If CH and at least one of E1 and E2 are present, the rule-based systems 312 may identify the text starting with the line after CH until E1 or E2, whichever is present. Next, the rule-based systems 312 may remove the cancellation message from the extracted text. If no text is found, the rule-based systems 312 may proceed to the next step. During the second step, the object detection models 316 may determine bounding box predictions for the certificate holder area (e.g., 608 in FIG. 6). Subsequently, the identified area may be cropped out and an API call may be instantiated to a selected foundation model with the byte array of the cropped image (along with a prompt) to get the text from the area.

In one aspect, the entities related to Certificate Holder Name 610 and Address 612 in the input 202 (e.g., 2 entities) may be identified and extracted by the server system 114 and saved in database 220 which is associated (e.g., memory 320 of FIG. 4) or accessible by the server system 114.

According to additional embodiments, information relating to the entities extracted from the input 202 (e.g., server-side analysis, model inference, classification) may be stored in at least one relational database of the system 100 (e.g., one of computing systems 116*a*, 116*b*, 116*c*, . . . 116*n* in FIG. 1) and transmitted by the transceiver module 304 of the server system 114 to the application downloaded and installed on at least one requesting computing device or system 104, 106, 108 for display, such that user 102*a*, 102*b* . . . 102*n* may interact with the outputs by the server system 114 via the application.

According to one implementation, the information relating to the entities extracted from the input 20 may include a map with a number of keys (e.g., a dictionary or key-value pair structure) of the map representing each of the 27 entities and the values being the corresponding values. This may be saved in a relational database deployed within the system 100 and accessible by the server system 114. As such, the computing system and method of the present disclosure convert an unstructured format (e.g., a PDF file) to a structured one (e.g., information saved in a relational database), and the structured information may be accessed and used for a wide range of applications such as contractor safety management. In an embodiment, the user-facing application downloaded and installed on each hosting computing device or system 104, 106, or 108 of FIG. 2 may display the outputs to a user through a user interface (UI) of the application where each extraction result or prediction may be accepted or rejected.

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Any reference to "one aspect," "an aspect," "an implementation," "one example," and the like means that a particular feature, structure, or characteristic described in connection with the aspect is included in at least one aspect. Thus, appearances of the phrases "in one aspect," "in an aspect," "in an implementation," and "in one example" in various places throughout the specification are not necessarily all referring to the same aspect. Furthermore, the particular features, structures or characteristics may be combined in any suitable manner in one or more aspects.

The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated.

The invention claimed is:

1. A system deployed within a communication network, the system comprising:

a computing device deployed within the communication network, comprising:

a non-transitory computer-readable storage medium having instructions stored thereon; and a processor coupled to the non-transitory computer-readable storage medium and configured to control a plurality of modules to execute the instructions to:

receive a digital document, determine a plurality of entities to be identified and retrieved from the digital document, analyze each entity to determine a plurality of identification and retrieval computational techniques, group the plurality of entities into different categories based on the plurality of identification and retrieval computational techniques, generate multiple images of the digital document in different dot per inches (DPIs), extract machine-readable texts from the multiple images of the digital document, conduct a text extraction for native PDF in the digital document, apply a first portion of the plurality of identification and retrieval computational techniques to identify and retrieve a first category of the plurality of entities based at least upon the machine-readable texts extracted from the multiple images of the digital document, apply a second portion of the plurality of identification and retrieval computational techniques to identify and retrieve a second category of the plurality of entities based at least upon a selected image of the multiple images, apply a third portion of the plurality of identification and retrieval computational techniques to identify and retrieve a third category of the plurality of entities based at least upon the selected image of the multiple images and the native PDF in the digital document, and save processing results of the plurality of identification and retrieval computational techniques in identifying and retrieval of each of the plurality of entities in at least one structured database.

2. The system of claim 1, wherein the digital document is in a portable document format (PDF).

3. The system of claim 1, wherein the plurality of images of the digital document in different DPIs include a first image with 200 DPI, a second image with 400 DPI, and a third image with 500 DPI, wherein the selected image of the multiple images includes the first image with 200 DPI.

4. The system of claim 1, wherein the first portion of the plurality of identification and retrieval computational techniques include at least one rule-based system using label-value techniques in identifying and retrieving the first category entities from the digital document based at least upon the machine-readable texts extracted from the multiple images of the digital document, the second portion of the plurality of identification and retrieval computational techniques include a plurality of binary classifiers configured to detect a presence of each of the second category entities in the digital document based at least upon the selected image of the multiple images, and third portion of the plurality of identification and retrieval computational techniques include at least one computer vision object detection machine learning model configured to identify an area in the selected image of the multiple images and the native PDF containing information relating to the third category entities, and at least one generative artificial intelligence model configured to extract the information from the area.

5. The system of claim 1, wherein the processor is further configured to control the plurality of modules to execute the instructions to de-skew each of the multiple images of the digital document to correct a tilt or rotation of each image.

6. The system of claim 4, wherein the processor is further configured to control the plurality of modules to execute the instructions to apply the at least one rule-based system to identify a label in the machine-readable texts that is in a textual or spatial proximity to a value to be extracted.

7. The system of claim 4, wherein the processor is further configured to control the plurality of modules to execute the instructions to apply the at least one computer vision object detection machine learning model to determine bounding box coordinates of the area.

8. The system of claim 7, wherein the processor is further configured to control the plurality of modules to execute the instructions to crop out the area based on the bounding box coordinates and instantiate an application programming call to the at least one generative artificial intelligence model using a byte array of a cropped image of the area for extracting the information from the area.

9. The system of claim 4, wherein the processor is further configured to control the plurality of modules to execute the instructions to apply the plurality of binary classifiers to simultaneously process textual, layout, and visual information contained in the selected image of the multiple images.

10. The system of claim 4, wherein the plurality of binary classifiers require no separate encoders and use a self-supervised pre-training approach that incorporates masked language modeling to predict masked tokens using visual and text context, masked image modeling, and word-patch alignment to ensure correspondence between visual and text modalities.

11. A computer-implemented method, comprising:

receiving, by a processor of a computing device deployed within a communication network, a digital document;

determining a plurality of entities to be identified and retrieved from the digital document;

analyzing each entity to determine a plurality of identification and retrieval computational techniques;

grouping the plurality of entities into different categories based on the plurality of identification and retrieval computational techniques;

generating multiple images of the digital document in different dot per inches (DPIs);

extracting machine-readable texts from the multiple images of the digital document;

conducting a text extraction for native PDF in the digital document;

applying a first portion of the plurality of identification and retrieval computational techniques to identify and retrieve a first category of the plurality of entities based at least upon the machine-readable texts extracted from the multiple images of the digital document;

applying a second portion of the plurality of identification and retrieval computational techniques to identify and retrieve a second category of the plurality of entities based at least upon a selected image of the multiple images;

applying a third portion of the plurality of identification and retrieval computational techniques to identify and retrieve a third category of the plurality of entities based at least upon the selected image of the multiple images and the native PDF in the digital document; and saving processing results of the plurality of identification and retrieval computational techniques in identifying and retrieval of each of the plurality of entities in at least one structured database.

12. The computer-implemented method of claim 11, wherein the digital document is in a portable document format (PDF).

13. The computer-implemented method of claim 11, wherein the plurality of images of the digital document in different DPIs include a first image with 200 DPI, a second image with 400 DPI, and a third image with 500 DPI, wherein the selected image of the multiple images includes the first image with 200 DPI.

14. The computer-implemented method of claim 11, wherein the first portion of the plurality of identification and retrieval computational techniques include at least one rule-based system using label-value techniques in identifying and retrieving the first category entities from the digital document based at least upon the machine-readable texts extracted from the multiple images of the digital document, the second portion of the plurality of identification and retrieval computational techniques include a plurality of binary classifiers configured to detect a presence of each of the second category entities in the digital document based at least upon the selected image of the multiple images, and third portion of the plurality of identification and retrieval computational techniques include at least one computer vision object detection machine learning model configured to identify an area in the selected image of the multiple images and the native PDF containing information relating to the third category entities, and at least one generative artificial intelligence model configured to extract the information from the area.

15. The computer-implemented method of claim 11, further comprising de-skewing each of the multiple images of the digital document to correct a tilt or rotation of each image.

16. The computer-implemented method of claim 11, further comprising applying the at least one rule-based system to identify a label in the machine-readable texts that is in a textual or spatial proximity to a value to be extracted.

17. The computer-implemented method of claim 11, further comprising applying the at least one computer vision object detection machine learning model to determine bounding box coordinates of the area.

18. The computer-implemented method of claim 17, further comprising cropping out the area based on the bounding box coordinates and instantiating an application programming call to the at least one generative artificial intelligence model using a byte array of a cropped image of the area for extracting the information from the area.

19. The computer-implemented method of claim 14, further comprising applying the plurality of binary classifiers to simultaneously process textual, layout, and visual information contained in the selected image of the multiple images.

20. The computer-implemented method of claim 14, wherein the plurality of binary classifiers require no separate encoders and use a self-supervised pre-training approach that incorporates masked language modeling to predict masked tokens using visual and text context, masked image modeling, and word-patch alignment to ensure correspondence between visual and text modalities.

* * * * *